(12) United States Patent
Scott et al.

(10) Patent No.: US 9,035,774 B2
(45) Date of Patent: May 19, 2015

(54) INTERROGATOR AND SYSTEM EMPLOYING THE SAME

(75) Inventors: Hugh Logan Scott, Fort Collins, CO (US); Steven D. Roemerman, Highland Village, TX (US); John P. Volpi, Garland, TX (US)

(73) Assignee: Lone Star IP Holdings, LP, Plano, TX (US)

( * ) Notice: Subject to any disclaimer, the term of this patent is extended or adjusted under 35 U.S.C. 154(b) by 140 days.

(21) Appl. No.: 13/443,594

(22) Filed: Apr. 10, 2012

(65) Prior Publication Data

US 2012/0256730 A1     Oct. 11, 2012

Related U.S. Application Data

(60) Provisional application No. 61/474,056, filed on Apr. 11, 2011.

(51) Int. Cl.
| | |
|---|---|
| *G08B 13/14* | (2006.01) |
| *G01S 5/02* | (2010.01) |
| *G01S 13/75* | (2006.01) |
| *G01S 13/90* | (2006.01) |
| *G01S 5/12* | (2006.01) |

(52) U.S. Cl.
CPC ............ *G01S 5/0221* (2013.01); *G01S 13/751* (2013.01); *G01S 13/9035* (2013.01); *G01S 2013/9064* (2013.01); *G01S 5/12* (2013.01)

(58) Field of Classification Search
USPC .......... 340/10.1, 10.4, 572.1, 539.13; 607/18; 342/107, 25 B, 25 F; 235/439
See application file for complete search history.

(56) References Cited

U.S. PATENT DOCUMENTS

| | | |
|---|---|---|
| 3,367,431 A | 2/1968 | Baker |
| 3,564,662 A | 2/1971 | Dold |
| 3,675,190 A | 7/1972 | Auer, Jr. et al. |
| 3,802,555 A | 4/1974 | Grasty et al. |
| 3,941,132 A | 3/1976 | Lenaghan |
| 3,965,907 A | 6/1976 | Hardy et al. |
| 4,114,601 A | 9/1978 | Abels |
| 4,151,913 A | 5/1979 | Freitag |
| 4,164,320 A | 8/1979 | Irazoqui et al. |
| 4,193,405 A | 3/1980 | Abels |
| 4,213,197 A | 7/1980 | Mágori |

(Continued)

FOREIGN PATENT DOCUMENTS

| | | |
|---|---|---|
| DE | 19923983 | 12/2000 |
| EP | 0639817 | 2/1995 |

(Continued)

OTHER PUBLICATIONS

U.S. Appl. No. 10/841,192, filed May 7, 2004, Roemerman et al.

(Continued)

*Primary Examiner* — Benjamin C Lee
*Assistant Examiner* — Israel Daramola
(74) *Attorney, Agent, or Firm* — Boisbrun Hofman, PLLC

(57) ABSTRACT

An interrogator and system employing the same. In one embodiment, the interrogator includes a receiver configured to receive a return signal from a tag and a sensing module configured to provide a time associated with the return signal. The interrogator also includes a processor configured to employ synthetic aperture radar processing on the return signal in accordance with the time to locate a position of the tag.

20 Claims, 20 Drawing Sheets

(56) References Cited

U.S. PATENT DOCUMENTS

| | | | |
|---|---|---|---|
| 4,249,128 A | 2/1981 | Karbowski | |
| 4,289,032 A | 9/1981 | Tominaga et al. | |
| 4,295,537 A | 10/1981 | McAvinn et al. | |
| 4,342,391 A | 8/1982 | Schainholz | |
| 4,359,015 A | 11/1982 | Ritchey | |
| 4,361,231 A | 11/1982 | Patience | |
| 4,422,548 A | 12/1983 | Cheesman et al. | |
| 4,422,584 A | 12/1983 | Dashnier et al. | |
| 4,498,076 A | 2/1985 | Lichtblau | |
| 4,510,489 A | 4/1985 | Anderson, III et al. | |
| 4,514,692 A | 4/1985 | Johnson et al. | |
| 4,526,177 A | 7/1985 | Rudy et al. | |
| 4,541,992 A | 9/1985 | Jerge et al. | |
| 4,549,184 A * | 10/1985 | Boles et al. | 342/25 B |
| 4,643,303 A | 2/1987 | Arp et al. | |
| 4,650,464 A | 3/1987 | Ruiz et al. | |
| 4,658,818 A | 4/1987 | Miller, Jr. et al. | |
| 4,821,023 A | 4/1989 | Parks | |
| 4,832,198 A | 5/1989 | Alikhan | |
| 4,855,909 A | 8/1989 | Vincent et al. | |
| 4,857,713 A | 8/1989 | Brown | |
| 4,887,715 A | 12/1989 | Spahn et al. | |
| 4,889,230 A | 12/1989 | Zachry | |
| 4,903,837 A | 2/1990 | Duello | |
| 4,907,000 A | 3/1990 | Tabourier | |
| 4,922,922 A | 5/1990 | Pollock et al. | |
| 4,943,939 A | 7/1990 | Hoover | |
| 5,009,275 A | 4/1991 | Sheehan | |
| 5,031,642 A | 7/1991 | Nosek | |
| 5,057,095 A | 10/1991 | Fabian | |
| 5,103,210 A | 4/1992 | Rode et al. | |
| 5,105,829 A | 4/1992 | Fabian et al. | |
| 5,107,862 A | 4/1992 | Fabian et al. | |
| 5,186,322 A | 2/1993 | Harreld et al. | |
| 5,188,126 A | 2/1993 | Fabian et al. | |
| 5,190,059 A | 3/1993 | Fabian et al. | |
| 5,231,273 A | 7/1993 | Caswell et al. | |
| 5,241,568 A | 8/1993 | Fernandez et al. | |
| 5,284,632 A | 2/1994 | Kudla et al. | |
| 5,300,120 A | 4/1994 | Knapp et al. | |
| 5,329,944 A | 7/1994 | Fabian et al. | |
| 5,353,011 A | 10/1994 | Wheeler et al. | |
| 5,354,975 A | 10/1994 | Ishibashi et al. | |
| 5,357,240 A | 10/1994 | Sanford et al. | |
| 5,374,261 A | 12/1994 | Yoon | |
| 5,381,137 A | 1/1995 | Ghaem et al. | |
| 5,382,784 A | 1/1995 | Eberhardt | |
| 5,414,730 A | 5/1995 | Lundquist et al. | |
| 5,433,929 A | 7/1995 | Riihimaki et al. | |
| 5,443,082 A | 8/1995 | Mewburn | |
| 5,451,380 A | 9/1995 | Zinnanti | |
| 5,456,718 A | 10/1995 | Szymaitis | |
| 5,460,178 A | 10/1995 | Hudon et al. | |
| 5,491,468 A | 2/1996 | Everett et al. | |
| 5,528,232 A | 6/1996 | Verma et al. | |
| 5,594,384 A | 1/1997 | Carroll et al. | |
| 5,610,811 A | 3/1997 | Honda | |
| 5,629,498 A | 5/1997 | Pollock et al. | |
| 5,650,596 A | 7/1997 | Morris et al. | |
| 5,689,239 A | 11/1997 | Turner et al. | |
| 5,781,442 A | 7/1998 | Engleson et al. | |
| 5,792,138 A | 8/1998 | Shipp | |
| 5,793,324 A | 8/1998 | Aslanidis et al. | |
| 5,801,371 A | 9/1998 | Kahn et al. | |
| 5,827,215 A | 10/1998 | Yoon | |
| 5,864,323 A | 1/1999 | Berthon | |
| 5,904,708 A * | 5/1999 | Goedeke | 607/18 |
| 5,923,001 A | 7/1999 | Morris et al. | |
| 5,931,824 A | 8/1999 | Stewart et al. | |
| 5,979,941 A | 11/1999 | Mosher, Jr. et al. | |
| 5,986,550 A | 11/1999 | Rapaport et al. | |
| 6,026,818 A | 2/2000 | Blair et al. | |
| 6,037,870 A | 3/2000 | Alessandro | |
| 6,046,683 A * | 4/2000 | Pidwerbetsky et al. | 340/10.4 |
| 6,097,374 A | 8/2000 | Howard | |
| 6,150,921 A | 11/2000 | Werb et al. | |
| D435,557 S | 12/2000 | Eisenberg et al. | |
| 6,169,483 B1 | 1/2001 | Ghaffari et al. | |
| 6,211,672 B1 | 4/2001 | Bauman et al. | |
| 6,230,888 B1 | 5/2001 | Frieze et al. | |
| 6,264,106 B1 | 7/2001 | Bridgelall | |
| 6,265,962 B1 | 7/2001 | Black et al. | |
| 6,294,997 B1 | 9/2001 | Paratore et al. | |
| 6,300,872 B1 | 10/2001 | Mathias et al. | |
| 6,305,605 B1 | 10/2001 | Goetz et al. | |
| 6,307,517 B1 | 10/2001 | Lee | |
| 6,342,187 B1 | 1/2002 | Jacob et al. | |
| 6,366,206 B1 | 4/2002 | Ishikawa et al. | |
| 6,377,176 B1 | 4/2002 | Lee | |
| 6,394,355 B1 | 5/2002 | Schlieffers et al. | |
| D459,246 S | 6/2002 | Power et al. | |
| 6,424,262 B2 | 7/2002 | Garber et al. | |
| 6,424,263 B1 | 7/2002 | Lee et al. | |
| 6,429,776 B1 | 8/2002 | Alicot et al. | |
| 6,446,794 B1 | 9/2002 | Hacikyan | |
| 6,448,886 B2 | 9/2002 | Garber et al. | |
| 6,483,427 B1 | 11/2002 | Werb | |
| 6,484,050 B1 | 11/2002 | Carroll et al. | |
| 6,486,783 B1 | 11/2002 | Hausladen et al. | |
| 6,492,905 B2 | 12/2002 | Mathias et al. | |
| 6,492,933 B1 | 12/2002 | McEwan | |
| 6,496,112 B1 | 12/2002 | Vega | |
| 6,496,113 B2 | 12/2002 | Lee et al. | |
| 6,496,806 B1 | 12/2002 | Horwitz et al. | |
| 6,509,217 B1 | 1/2003 | Reddy | |
| 6,512,478 B1 | 1/2003 | Chien | |
| 6,515,591 B2 | 2/2003 | Lake et al. | |
| 6,516,272 B2 | 2/2003 | Lin | |
| 6,523,681 B1 | 2/2003 | Hacikyan | |
| 6,535,175 B2 | 3/2003 | Brady et al. | |
| 6,600,421 B2 | 7/2003 | Freeman | |
| 6,600,905 B2 | 7/2003 | Greeff et al. | |
| 6,609,656 B1 | 8/2003 | Elledge | |
| 6,618,024 B1 | 9/2003 | Adair et al. | |
| 6,659,344 B2 | 12/2003 | Otto et al. | |
| 6,686,829 B1 | 2/2004 | Hohberger et al. | |
| 6,696,954 B2 | 2/2004 | Chung | |
| 6,698,285 B1 | 3/2004 | Hacikyan | |
| 6,708,881 B2 | 3/2004 | Hartmann | |
| 6,720,866 B1 | 4/2004 | Sorrells et al. | |
| 6,724,309 B2 | 4/2004 | Grose et al. | |
| 6,753,782 B2 | 6/2004 | Power | |
| 6,756,880 B2 | 6/2004 | Hartmann | |
| 6,757,068 B2 | 6/2004 | Foxlin | |
| 6,759,789 B2 | 7/2004 | Hartmann | |
| 6,759,968 B2 | 7/2004 | Zierolf | |
| 6,774,782 B2 | 8/2004 | Runyon et al. | |
| 6,777,623 B2 | 8/2004 | Ballard | |
| 6,794,000 B2 | 9/2004 | Adams et al. | |
| 6,812,707 B2 | 11/2004 | Yonezawa et al. | |
| 6,812,842 B2 | 11/2004 | Dimmer | |
| 6,822,570 B2 | 11/2004 | Dimmer et al. | |
| 6,838,874 B1 | 1/2005 | Franklin | |
| 6,838,990 B2 | 1/2005 | Dimmer | |
| 6,853,194 B2 | 2/2005 | Nelson et al. | |
| 6,859,190 B2 | 2/2005 | Pillai et al. | |
| 6,861,954 B2 | 3/2005 | Levin | |
| 6,940,408 B2 | 9/2005 | Ferguson et al. | |
| 6,958,696 B2 | 10/2005 | Hartmann et al. | |
| 6,959,031 B2 | 10/2005 | Haynes et al. | |
| 6,966,493 B2 | 11/2005 | Hartmann | |
| 6,967,574 B1 | 11/2005 | Nelson | |
| 6,987,451 B2 | 1/2006 | McKeown et al. | |
| 6,989,750 B2 | 1/2006 | Shanks et al. | |
| 6,992,952 B2 | 1/2006 | Endo et al. | |
| 6,998,541 B2 | 2/2006 | Morris et al. | |
| 7,001,366 B2 | 2/2006 | Ballard | |
| 7,005,968 B1 | 2/2006 | Bridgelall | |
| 7,009,496 B2 | 3/2006 | Arneson et al. | |
| 7,009,519 B2 | 3/2006 | Leonard et al. | |
| 7,012,529 B2 | 3/2006 | Sajkowsky | |
| 7,014,100 B2 | 3/2006 | Zierolf | |
| 7,019,650 B2 | 3/2006 | Volpi et al. | |
| 7,023,356 B2 | 4/2006 | Burkhardt et al. | |

(56) References Cited

U.S. PATENT DOCUMENTS

| | | |
|---|---|---|
| 7,030,762 B2 | 4/2006 | Hartmann et al. |
| 7,053,755 B2 | 5/2006 | Atkins et al. |
| 7,079,034 B2 | 7/2006 | Stilp |
| 7,084,768 B2 | 8/2006 | Hartmann et al. |
| 7,095,311 B2 | 8/2006 | Coates et al. |
| 7,096,279 B2 | 8/2006 | Hartmann et al. |
| 7,100,052 B2 | 8/2006 | Ghazarian |
| 7,113,125 B2 | 9/2006 | Le Sesne |
| 7,126,479 B2 | 10/2006 | Claessens et al. |
| 7,129,840 B2 | 10/2006 | Hull et al. |
| 7,148,803 B2 | 12/2006 | Bandy et al. |
| 7,155,340 B2 | 12/2006 | Churan |
| 7,158,034 B2 | 1/2007 | Corbett |
| 7,158,598 B2 | 1/2007 | Schetelig et al. |
| 7,159,654 B2 | 1/2007 | Ellison et al. |
| 7,161,470 B2 | 1/2007 | Berquist et al. |
| 7,172,117 B2 | 2/2007 | Moore |
| 7,176,798 B2 | 2/2007 | Dimmer et al. |
| 7,193,504 B2 | 3/2007 | Carrender et al. |
| 7,245,227 B2 | 7/2007 | Winter et al. |
| 7,301,648 B2 | 11/2007 | Foxlin |
| 7,307,530 B2 | 12/2007 | Fabian et al. |
| 7,318,001 B2 | 1/2008 | Clark |
| 7,336,152 B2 | 2/2008 | Horwitz et al. |
| 7,411,506 B2 | 8/2008 | Volpi et al. |
| 7,411,921 B2 | 8/2008 | Strong et al. |
| 7,420,468 B2 | 9/2008 | Fabian et al. |
| 7,464,713 B2 | 12/2008 | Fabian et al. |
| 7,501,948 B2 | 3/2009 | Roemerman et al. |
| 7,525,431 B2 | 4/2009 | Britton, Jr. et al. |
| 7,530,315 B2 | 5/2009 | Tepera et al. |
| 7,540,287 B2 | 6/2009 | Chole |
| 7,541,933 B2 | 6/2009 | Volpi et al. |
| 7,548,153 B2 | 6/2009 | Gravelle et al. |
| 7,557,711 B2 | 7/2009 | Volpi et al. |
| 7,567,178 B2 | 7/2009 | Boyer et al. |
| 7,573,370 B2 | 8/2009 | Becker et al. |
| 7,587,368 B2 | 9/2009 | Felsher |
| 7,600,613 B2 | 10/2009 | Kang et al. |
| 7,671,744 B2 | 3/2010 | Volpi et al. |
| 7,755,491 B2 | 7/2010 | Volpi et al. |
| 7,760,097 B2 | 7/2010 | Volpi et al. |
| 7,764,178 B2 | 7/2010 | Volpi et al. |
| 7,893,840 B2 | 2/2011 | Volpi et al. |
| 7,948,357 B2 | 5/2011 | Bodin |
| 8,019,471 B2 | 9/2011 | Bogash et al. |
| 8,063,760 B2 | 11/2011 | Volpi et al. |
| 8,105,296 B2 | 1/2012 | Morris et al. |
| 8,117,955 B2 | 2/2012 | Roemerman et al. |
| 8,174,366 B2 | 5/2012 | Volpl et al. |
| 8,284,034 B2 | 10/2012 | Stewart et al. |
| 2001/0004237 A1 | 6/2001 | Lake et al. |
| 2001/0008390 A1 | 7/2001 | Berquist et al. |
| 2001/0013830 A1 | 8/2001 | Garber et al. |
| 2001/0034530 A1 | 10/2001 | Malackowski et al. |
| 2002/0005774 A1 | 1/2002 | Rudolph et al. |
| 2002/0008623 A1 | 1/2002 | Garber et al. |
| 2002/0010679 A1 | 1/2002 | Felsher |
| 2002/0044096 A1 | 4/2002 | Chung |
| 2002/0048330 A1 | 4/2002 | Schetelig et al. |
| 2002/0060630 A1 | 5/2002 | Power |
| 2002/0067263 A1 | 6/2002 | Tafoya et al. |
| 2002/0070845 A1 | 6/2002 | Reisinger et al. |
| 2002/0093431 A1 | 7/2002 | Zierolf |
| 2002/0105424 A1 | 8/2002 | Alicot et al. |
| 2002/0158120 A1 | 10/2002 | Zierolf |
| 2003/0006762 A1 | 1/2003 | Clements |
| 2003/0007473 A1 | 1/2003 | Strong et al. |
| 2003/0025604 A1 | 2/2003 | Freeman |
| 2003/0031819 A1 | 2/2003 | Adams et al. |
| 2003/0046083 A1 | 3/2003 | Devinney et al. |
| 2003/0076230 A1 | 4/2003 | Runyon et al. |
| 2003/0083964 A1 | 5/2003 | Horwitz et al. |
| 2003/0093334 A1 | 5/2003 | Barzilay |
| 2003/0111540 A1 | 6/2003 | Hartmann |
| 2003/0141366 A1 | 7/2003 | Hartmann |
| 2003/0142691 A1 | 7/2003 | Hartmann |
| 2003/0142741 A1 | 7/2003 | Hartmann |
| 2003/0142742 A1 | 7/2003 | Hartmann |
| 2003/0145036 A1 | 7/2003 | Hartmann et al. |
| 2003/0153294 A1 | 8/2003 | Hata |
| 2003/0179072 A1 | 9/2003 | Hartmann |
| 2003/0179077 A1 | 9/2003 | Hartmann et al. |
| 2003/0179093 A1 | 9/2003 | Hartmann et al. |
| 2003/0192557 A1 | 10/2003 | Krag et al. |
| 2003/0192722 A1 | 10/2003 | Ballard |
| 2003/0214389 A1 | 11/2003 | Arneson et al. |
| 2003/0220711 A1 | 11/2003 | Allen |
| 2004/0031626 A1 | 2/2004 | Morris et al. |
| 2004/0046643 A1 | 3/2004 | Becker et al. |
| 2004/0046645 A1 | 3/2004 | Atkins et al. |
| 2004/0075361 A1 | 4/2004 | Hartmann |
| 2004/0075560 A1 | 4/2004 | Hartmann et al. |
| 2004/0085192 A1 | 5/2004 | Hartmann |
| 2004/0090868 A1 | 5/2004 | Endo et al. |
| 2004/0100376 A1 | 5/2004 | Lye et al. |
| 2004/0129279 A1 | 7/2004 | Fabian et al. |
| 2004/0138555 A1 | 7/2004 | Krag et al. |
| 2004/0142660 A1 | 7/2004 | Churan |
| 2004/0155651 A1 | 8/2004 | Britton |
| 2004/0174261 A1 | 9/2004 | Volpi et al. |
| 2004/0250819 A1 | 12/2004 | Blair et al. |
| 2005/0075985 A1 | 4/2005 | Cartmell |
| 2005/0088299 A1 | 4/2005 | Brandy et al. |
| 2005/0099292 A1 | 5/2005 | Sajkowsky |
| 2005/0116033 A1 | 6/2005 | Moore |
| 2005/0128519 A1 | 6/2005 | Yamauchi |
| 2005/0201450 A1 | 9/2005 | Volpi et al. |
| 2005/0207617 A1 | 9/2005 | Sarnoff |
| 2005/0240305 A1 | 10/2005 | Bogash et al. |
| 2005/0248456 A1 | 11/2005 | Britton et al. |
| 2005/0282558 A1 | 12/2005 | Choi et al. |
| 2006/0006986 A1 | 1/2006 | Gravelle et al. |
| 2006/0017545 A1 | 1/2006 | Volpi et al. |
| 2006/0044137 A1 | 3/2006 | Morris et al. |
| 2006/0077036 A1 | 4/2006 | Roemermann et al. |
| 2006/0132351 A1 | 6/2006 | Le Sesne |
| 2006/0164212 A1 | 7/2006 | Roz |
| 2006/0202827 A1 | 9/2006 | Volpi et al. |
| 2006/0241399 A1 | 10/2006 | Fabian |
| 2006/0265164 A1 | 11/2006 | Clark |
| 2007/0032224 A1 | 2/2007 | Boyer et al. |
| 2007/0035383 A1 | 2/2007 | Roemerman et al. |
| 2007/0210921 A1 | 9/2007 | Volpi et al. |
| 2007/0216526 A1 | 9/2007 | Volpi et al. |
| 2008/0018432 A1 | 1/2008 | Volpi et al. |
| 2008/0018450 A1 | 1/2008 | Volpi et al. |
| 2008/0018468 A1 | 1/2008 | Volpi et al. |
| 2008/0018469 A1 | 1/2008 | Volpi et al. |
| 2008/0024276 A1 | 1/2008 | Volpi et al. |
| 2008/0024277 A1 | 1/2008 | Volpi et al. |
| 2008/0024278 A1 | 1/2008 | Volpi et al. |
| 2009/0014520 A1* | 1/2009 | Kofman et al. ............. 235/439 |
| 2009/0040025 A1* | 2/2009 | Volpi et al. ................ 340/10.1 |
| 2009/0160605 A1 | 6/2009 | Roemerman et al. |
| 2009/0219144 A1* | 9/2009 | Pettus ......................... 340/10.4 |
| 2010/0317713 A1 | 12/2010 | Olson et al. |
| 2012/0133512 A1 | 5/2012 | Volpi et al. |
| 2012/0256730 A1 | 10/2012 | Scott et al. |

FOREIGN PATENT DOCUMENTS

| | | |
|---|---|---|
| EP | 0948940 | 10/1999 |
| FR | 2635259 | 2/1990 |
| WO | WO9604530 | 2/1996 |
| WO | WO9911086 | 3/1999 |

OTHER PUBLICATIONS

"Automatic Identification—Radio Frequency Identification for Item Management," Part 6: Mode 3—Physical Layer, Anti Collision System and Protocols for Ultra High Frequency (UHF) Systems, Feb. 1, 2002, pp. 48-50, Refererence Number of Document: ISO/IEC WD

(56) References Cited

OTHER PUBLICATIONS 18000-6 Mode 3, Committee Identification: ISO/IEC SC31/WG 4, Secretariat: ANSI.

Codd, E.F., "A Relational Model of Data for Large Shared Data Banks," Communications of the ACM, Jun. 1970, pp. 377-387, vol. 13, No. 6, Association for Computing Machinery, New York, NY.

"EPC(TM) Radio-Frequency Identity Protocols Class-1 Generation-2 UHF RFID Protocol for Communications at 860 MHz-960 MHz," Version 1.0.9, Jan. 31, 2005, pp. 1-94, EPCglobal Inc.(TM), Lawrenceville, NJ.

"Technical Report: 860MHz-930MHz Class I Radio Frequency Identification Tag Radio Frequency & Logical Communication Interface Specification Candidate Recommendation," Version 1.0.1, Nov. 14, 2002, pp. 1-17, Auto-ID Center, Massachusetts Institute of Technology, Cambridge, MA.

Wald, H. et al., "Making Health Care Safer: A Critical Analysis of Patient Safety Practices," Evidence Report/Technology Assessment No. 43, Jul. 20, 2001, Ch. 43, pp. 487-499, University of California at San Francisco (UCSF)—Stanford University, San Francisco, CA.

"Whitepaper: EPCglobal Class 1 Gen 2 RFID Specification," 2005 (approved Dec. 2004), pp. 1-7, http://www.alientechnology.com/docs/AT_wp_EPCGlobal_WEB.pdf, Alien Technology Corporation, Morgan Hill, CA.

Technovelgy.com Electronic product code, Sep. 24, 2004, 1 pg.

* cited by examiner

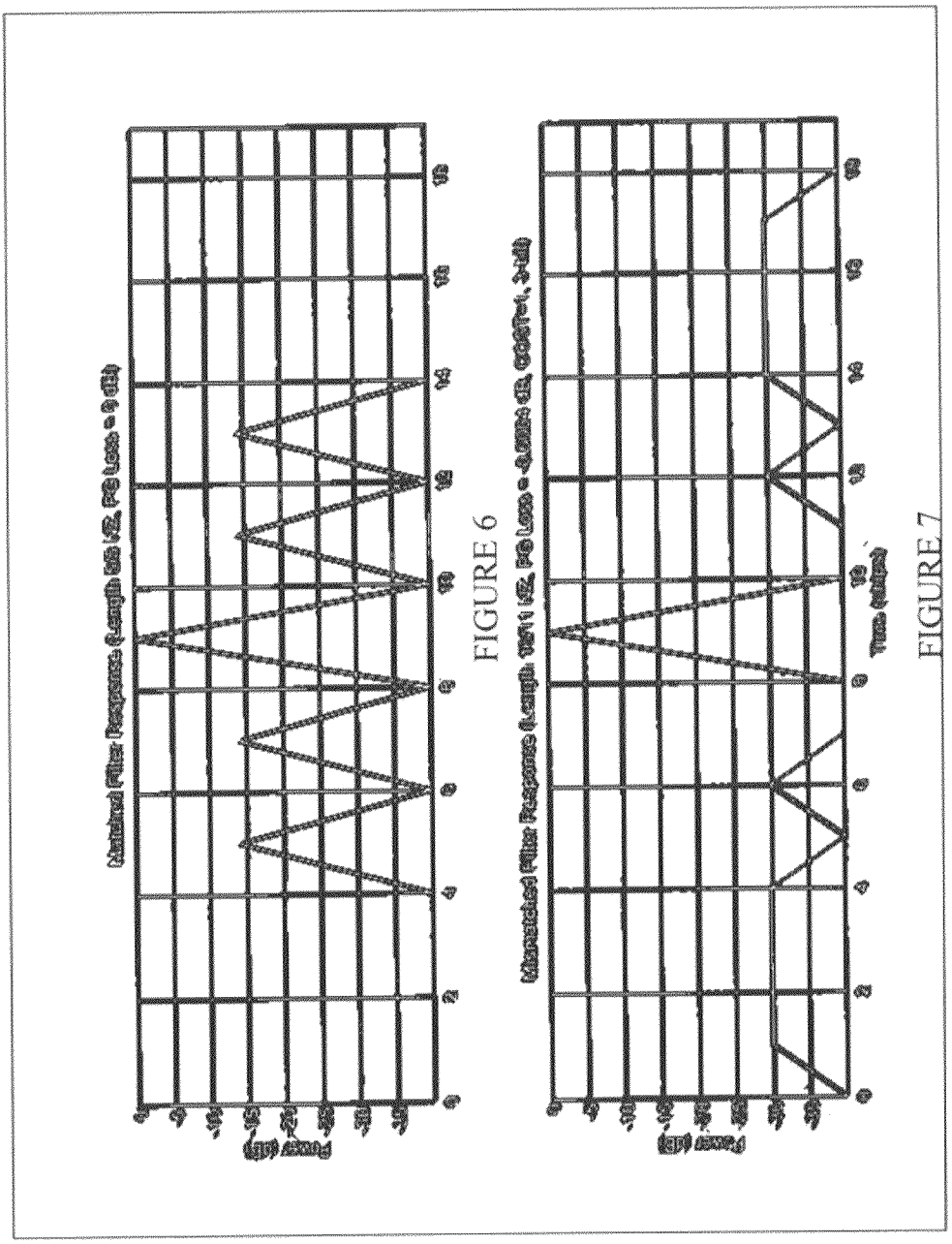

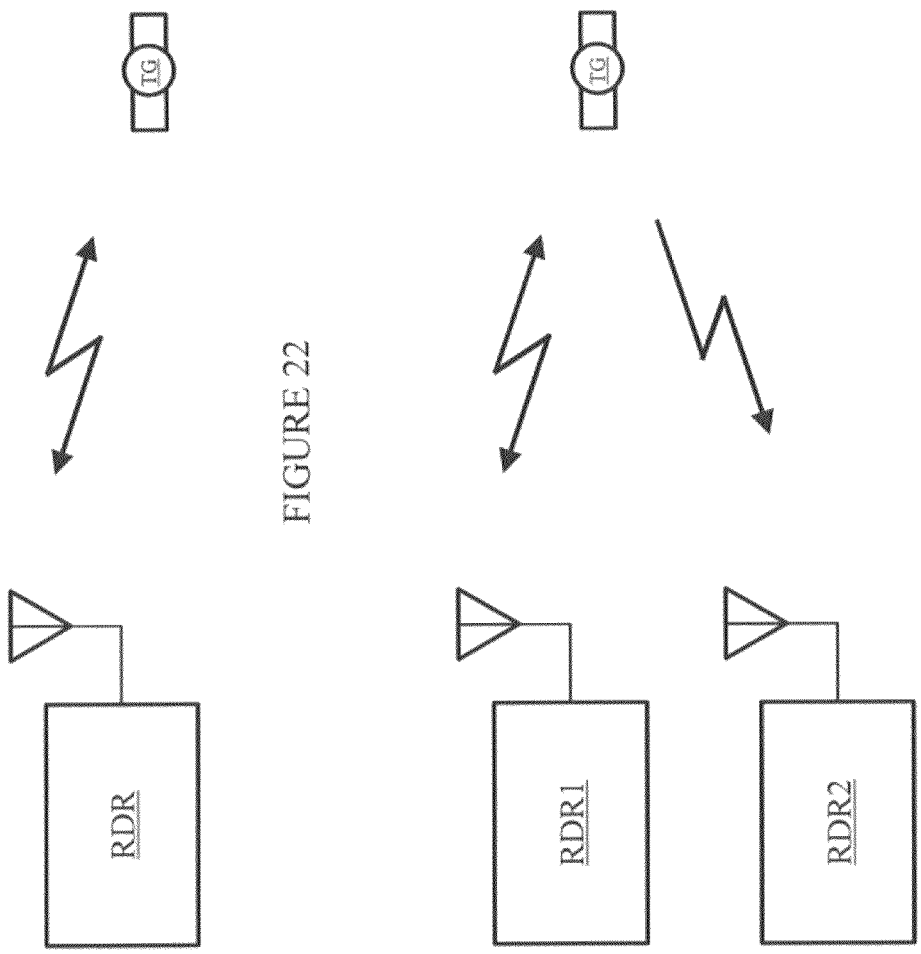

INTERROGATOR AND SYSTEM EMPLOYING THE SAME

This application claims the benefit of U.S. Provisional Application No. 61/474,056 entitled "Innovative, Novel, and Unconventional Integration of SAR-Like Processing Techniques with RFID," filed Apr. 11, 2011, which application is incorporated herein by reference.

TECHNICAL FIELD

The present invention is directed to radio frequency identification systems and weapon systems, and method of operating the same.

BACKGROUND

Radio Frequency Identification ("RFID") tags are finding wide application in inventory control and tracking systems. In these systems, a two-way communications link is established wherein readers (or interrogators) interrogate RFID tags to respond with their identification and perhaps other ancillary information. The RFID tags can be broadly separated into three categories, namely, active, semi-active and passive. The active RFID tags contain a battery and communicate on the reverse link (RFID tag to reader) using conventional radio frequency ("RF") communications techniques. The passive RFID tags typically derive power from the reader using a diode rectifier and then respond on the reverse link using a backscatter modulation technique that modulates the apparent radar cross section of the device. The semi-active RFID tags employs properties from the other two in that it has a battery, allowing it to respond to signals of lower amplitude than a passive RFID tag, however, its response is the same as a passive RFID tag in that it employs a backscatter modulation technique. The most common backscatter modulation approach is to modulate by shorting/opening an antenna of the RFID tag to vary the radar cross section ("RCS").

One major weakness with extant RFID systems is their poor sensitivity limiting operation to fairly high signal-to-noise ("SNR") regimes. This problem has been addressed, in part, with major improvements in sensitivity using knowledge of the target RFID tag's identification and a combination of coherent and noncoherent integration techniques. As addressed herein, further improvements are necessary to more accurately localize the position of an RFID tag.

SUMMARY OF THE INVENTION

These and other problems are generally solved or circumvented, and technical advantages are generally achieved, by advantageous embodiments of the present invention, which includes an interrogator and system employing the same. In one embodiment, the interrogator includes a receiver configured to receive a return signal from a tag and a sensing module configured to provide a time associated with the return signal. The interrogator also includes processor configured to employ synthetic aperture radar processing on the return signal in accordance with the time to locate a position of the tag.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 6 and 7 illustrate matched and mismatched filter responses, respectively;

FIGS. 22 and 23 illustrate views of embodiments of a RFID system;

DETAILED DESCRIPTION OF ILLUSTRATIVE EMBODIMENTS

Figure 1:
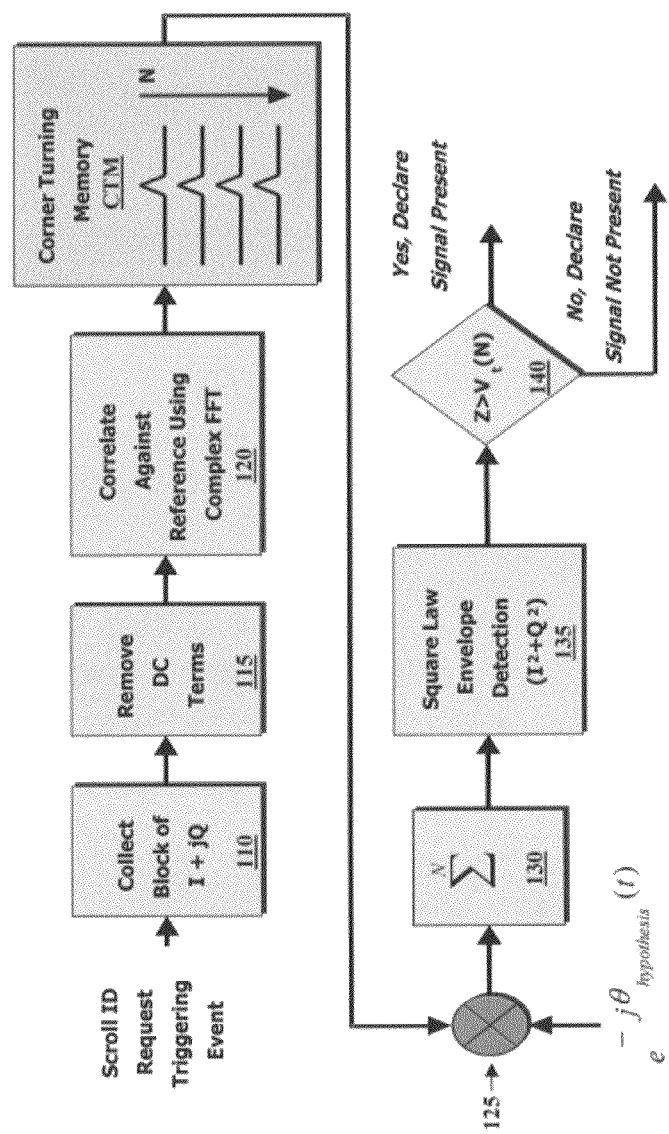
FIG. 1 illustrates a block diagram of an embodiment of a synthetic aperture radar processor.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present disclosure is related to RFID systems and weapon systems. For exemplary weapons and weapons systems, see U.S. patent application Ser. No. 10/841,192 entitled "Weapon and Weapon System Employing The Same," to Roemerman, et al., filed May 7, 2004, U.S. Pat. No. 7,530,315 entitled "Weapon and Weapon System Employing the Same," to Tepera, et al., issued May 5, 2009, and U.S. Pat. No. 8,117,955 entitled "Weapon Interface System and Delivery Platform Employing the Same," to Roemerman, et al., issued Feb. 21, 2012, which are incorporated herein by reference. Additionally, a related weapon and weapon system is provided in U.S. Patent Application Publication No. 2011/0017864 entitled "Small Smart Weapon and Weapon System Employing the Same," published January 27, which is a continuation in part of U.S. Pat. No. 7,895,946 entitled "Small Smart Weapon and Weapon System Employing the Same," issued Mar. 1, 2011, which is a continuation-in-part of U.S. Pat. No. 7,690,304 entitled "Small Smart Weapon and Weapon System Employing the Same," issued Apr. 6, 2010, which are incorporated herein by reference. For examples of RFID systems, see U.S. Patent Application Publication No. 2007/0035383, entitled "Radio Frequency Identification Interrogation Systems and Methods of Operating the Same," to Roemerman, et al., published Feb. 15, 2007, U.S. Pat. No. 7,019,650 entitled "Interrogator and Interrogation System Employing the Same," to Volpi, et al., issued on Mar. 28, 2006, U.S. Pat. No. 7,501,948, entitled "Interrogation System Employing Prior Knowledge About An Object To Discern An Identity Thereof," to Roemerman, et al., issued Mar. 10, 2009, U.S. Patent Application Publication No. 2006/0017545, entitled "Radio Frequency Identification Interrogation Systems and Methods of Operating the Same," to Volpi, et al., published Jan. 26, 2006, U.S. Patent Application Publication No. 2005/0201450, entitled "Interrogator And Interrogation System Employing The Same," to Volpi, et al., published Sep. 15, 2005, and U.S. Pat. No. 8,063,760, entitled "Interrogator and Interrogation System Employing the Same," to Volpi, et al., issued Nov. 22, 2011, all of which are incorporated herein by reference.

As disclosed herein, synthetic aperture radar ("SAR") techniques can be applied to the field of RFID to provide precise tag locations. A moving reader (or interrogator) can collect the reverse link carrier phase trajectory from RFID tag(s) and then process the same using SAR-like techniques to create an image of the location of the RFID tag(s). Backscatter modulation from the RFID tag(s) is used to discriminate RFID tag reflected energy from non-RFID tag reflected energy. As an adjunct invention, if at least some RFID tag positions are at apriori known positions, a reader's position can be ascertained yielding a position determination system applicable in environments where other navigation systems may not be suitable or denied, as examples global positioning system ("GPS") denial, or indoors.

Also, if the RFID tags (or objects containing the RFID tags) are moving (for example on an automobile, truck or boat) the reader can be stationary and still determine RFID tag positions. A feature for employing SAR-like techniques to localize the RFID tag positions is that there is relative motion between the reader and the RFID tag(s). Multiple readers acting in concert may have advantages in certain situations. These multistatic systems can exploit diversity techniques to extend range. Also, the radar cross section ("RCS") is angle dependant and may be enhanced through bistatic operation where the transmitting reader and the receiving reader are at different locations.

Employing frequency-hopping waveforms (e.g., stepped frequency) can also be advantageous, reducing the level of certain SAR processing artifacts and improving resolution. Additionally, the systems herein comprehend the integration of RFID tags and synthetic aperture radar with other technologies for increased accuracy and/or robustness including, but not limited to, cell tower triangulation and GPS/inertial integrated navigation. Additionally, the RFID system as described herein comprehends the use of RFID tag identification when only a partial signature can be decoded.

Referring now to FIG. 1, illustrated is a block diagram of an embodiment of a synthetic aperture radar processor. As mentioned above, a RFID tag's response may be coherently integrated over the RFID tag's response interval by using a local reference equal to the RFID tag's expected response. Multiple RFID tag responses can then be coherently integrated following a corner turning memory (designated "CTM") working on the presumption that the RFID tag responses have the same RF phase (equivalent to setting $\theta_{hypothesis}=0$). In the SAR approach, a RFID tag response phase trajectory is hypothesized based on knowledge of the reader's motion as a function of time, removed from the received signal, and then coherently sum the resultant. If there was indeed a RFID tag at that location, the response will be strong. The equation below specifies the hypothesis using x, y and z coordinates.

$$\theta_{hypothesis}(t) = \frac{2\pi}{\lambda} \sqrt{\frac{(x(t)_{reader} - x_{hypothesis})^2 +}{(y(t)_{reader} - y_{hypothesis})^2 + (z(t)_{reader} - z_{hypothesis})^2}}$$

More specifically, the process starts with a raw I+jQ sample data collection process triggered by a scroll identification ("ID") request triggering event. This trigger denotes the expected time at which the RFID tag is expected to begin responding to a read interrogation. The raw I+jQ sample data (I=Inphase, Q=Quadrature counterpart) is collected into a memory 110 with duration nominally the same as the expected RFID tag response duration. Strong direct current ("DC") response terms are removed in module 115 to eliminate bias, for example, by subtracting off the mean of I+jQ averaged over the response duration.

Single interrogation response complex correlation responses are computed in module 120 using apriori knowledge of the expected RFID tag response (the reference). This can be implemented using time domain processing (e.g., MATLAB "xcorr" function) but may be more efficiently performed using frequency domain methods employing complex fast Fourier transforms ("FFTs"). This is a common correlation technique well known to those skilled in the art and is mathematically analogous to a convolution operation. If the incoming signal matches the referenced signal, a strong correlation peak will be generated. It should be noted that the module 120 may include a filter (such as a mismatched filter described below) to further enhance a resolution of the correlation peak. Time domain complex correlation responses are written into the corner turning memory CTM by row with each column corresponding to a specific relative delay between the reference signal and the recorded signal in memory 110. Once the desired number of interrogation responses ("N" in corning turning memory CTM) has been obtained, correlation responses are read out by column and phase corrected (by logic 125) in accordance with the $\theta_{hypothesis}(t)$ specific to a particular hypothesized RFID tag location.

For each hypothesized location, N corrected RFID tag responses are coherently integrated in a summer 130 and upon completion, envelope detected in module 135, preferably using a square law detection method ($I^2+Q^2$). In module 140, the resultant "z", associated with a particular RFID tag location hypothesis, is compared to a threshold $V_t(N)$ and if it is greater, the RFID tag is declared present at that location. One skilled in the art will recognize several variations in the processing of FIG. 1; specifically, alternative crosscorrelation techniques for module 120, various noncoherent detection schemes for 150 (e.g. $(I^2+Q^2)^{1/2}$), and possibly including the addition of noncoherent integration steps in module 135. Sequential observer techniques (e.g., Tong detector or M of N) may also be contemplated for module 140 (see, e.g., "Low-Level GPS/DSSS Signal Acquisition Techniques, Tong Detector vs. M-of-N Detector," J. Shima, May 21, 2002). It should be noted that the SAR processing may be embodied in a processor with associated memory. The processor may include one or more of general-purpose computers, special-purpose computers, microprocessors, digital signal processors ("DSPs"), and processors based on a multicore processor architecture, as non-limiting examples.

The memory may be of any type suitable to the local application environment, and may be implemented using any suitable volatile or nonvolatile data storage technology such as a semiconductor-based memory device, a magnetic memory device and system, an optical memory device and system, fixed memory, and removable memory. The programs stored in the memory may include program instructions that, when executed by an associated processor, enable the communication element to perform tasks as described herein. Exemplary embodiments of the system, subsystems and modules as described herein may be implemented, at least in part, by computer software executable by processors, by hardware, or combinations thereof.

Figure 2:
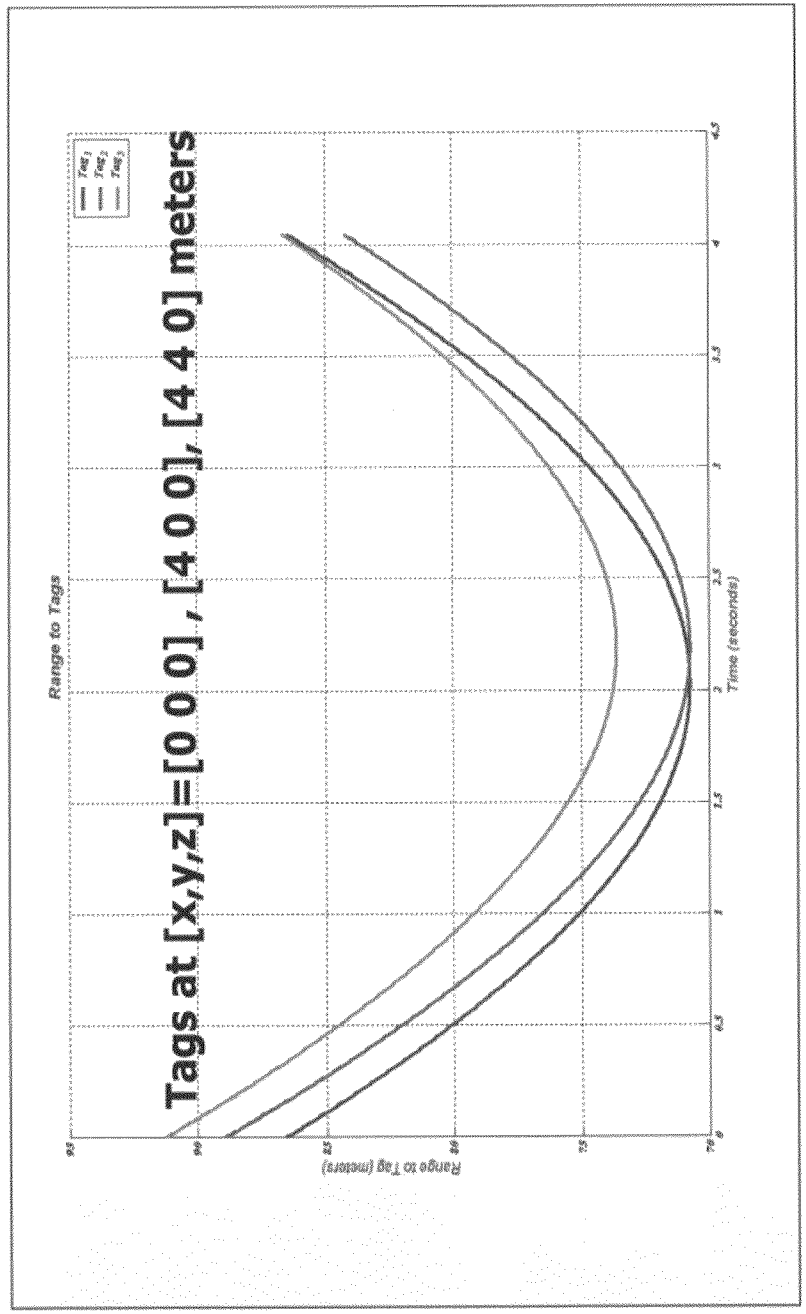
FIG. 2 illustrates a graphical representation of the radial range of RFID tags as a function of time.

Turning now to FIG. 2, illustrated is a graphical representation of the radial range of RFID tags as a function of time. Presume that a reader is flying in a straight east to west line, 50 meters south of a tag at [x,y,z]=[0,0,0]. Then, the radial range as a function of time will be as depicted in FIG. 2. The radial range for each of the three RFID tags is distinct based on its location, but is less than 100 meters in the illustrated embodiment. The radial range of the flight trajectory may vary depending on the application such as a 50 meter half circle observed trajectory or a 50 meter full circle observed trajectory. In other embodiments, the flight trajectory can be a straight line in the direction of the target or a logarithmic trajectory in the direction of the target.

Figure 3:
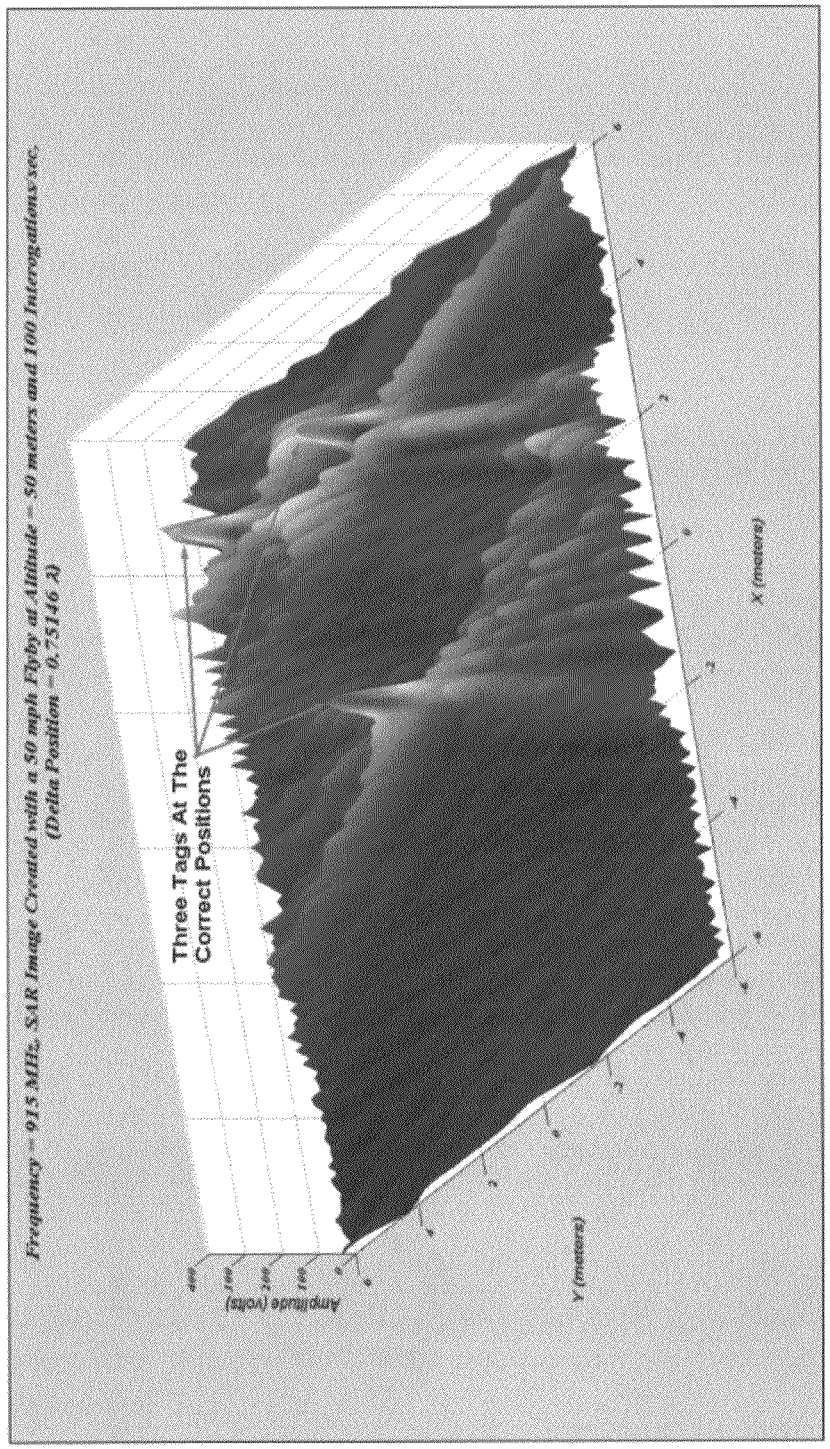
FIG. 3 illustrates a graphical representation of a synthetic aperture radar image associated with three RFID tags.

Turning now to FIG. 3, illustrated is a graphical representation of a synthetic aperture radar image associated with three RFID tags. The three RFID tags are resolved in position based on their expected phase trajectories. Other forms of SAR such as side looking SAR and spotlight SAR would yield similar images. The reader is operating at 915 megahertz ("MHz") and moving at 50 miles-per-hour ("mph") at an altitude of 50 meters ("m"). The reader is performing 100 interrogations per second and the delta position is 0.75146 lambda.

Figure 4:
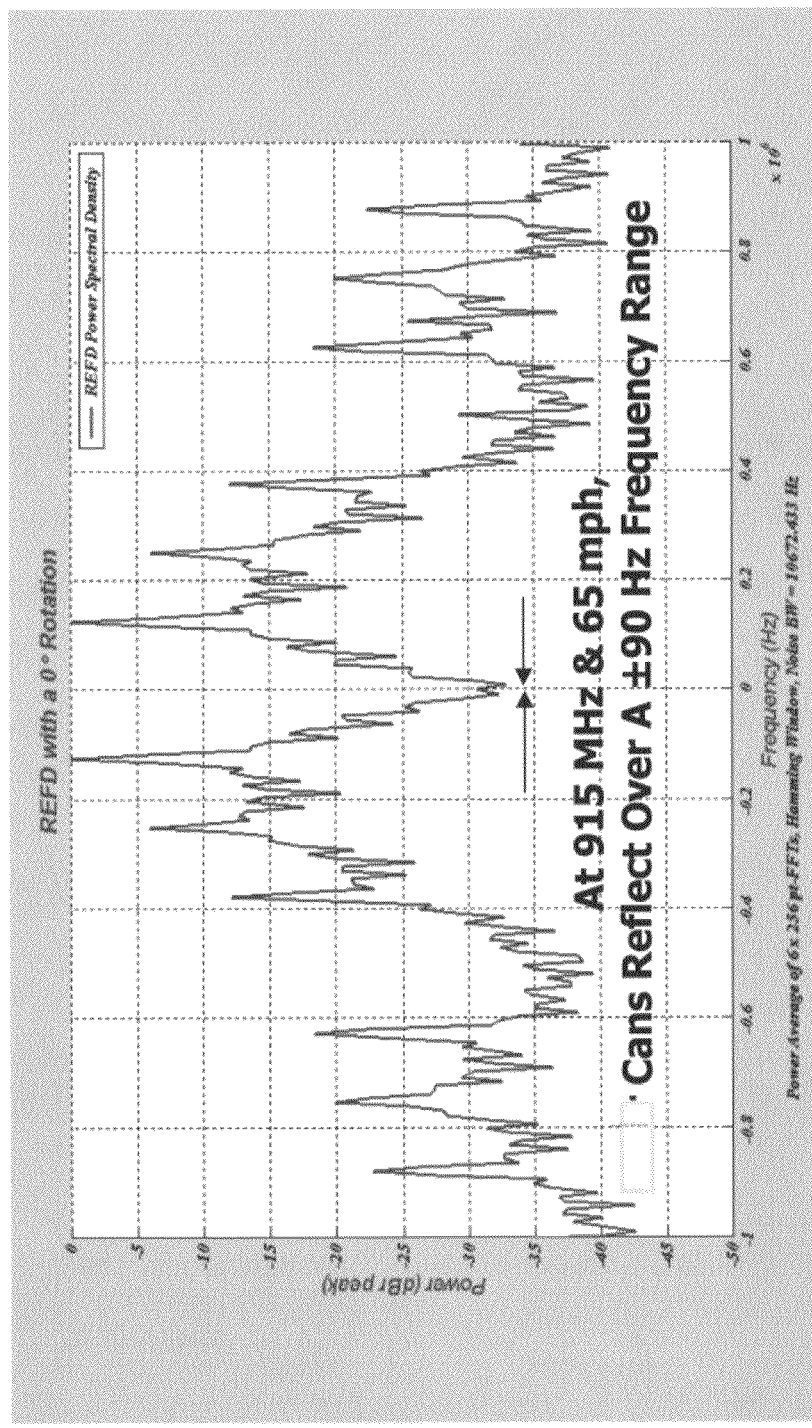
FIG. 4 illustrates a graphical representation of a RFID backscatter spectrum.

Turning now to FIG. 4, illustrated is a graphical representation of a RFID backscatter spectrum. The illustrated embodiment shows the measured spectrum of a particular auto-identification ("ID") RFID's backscatter over a ±1 MHz span. Non-modulating passive reflectors (e.g., metal cans) yield a maximum Doppler offset of ±90 hertz ("Hz") and so can be filtered out with a strong notch filter without losing much of the desired RFID tag signal.

Figure 5:
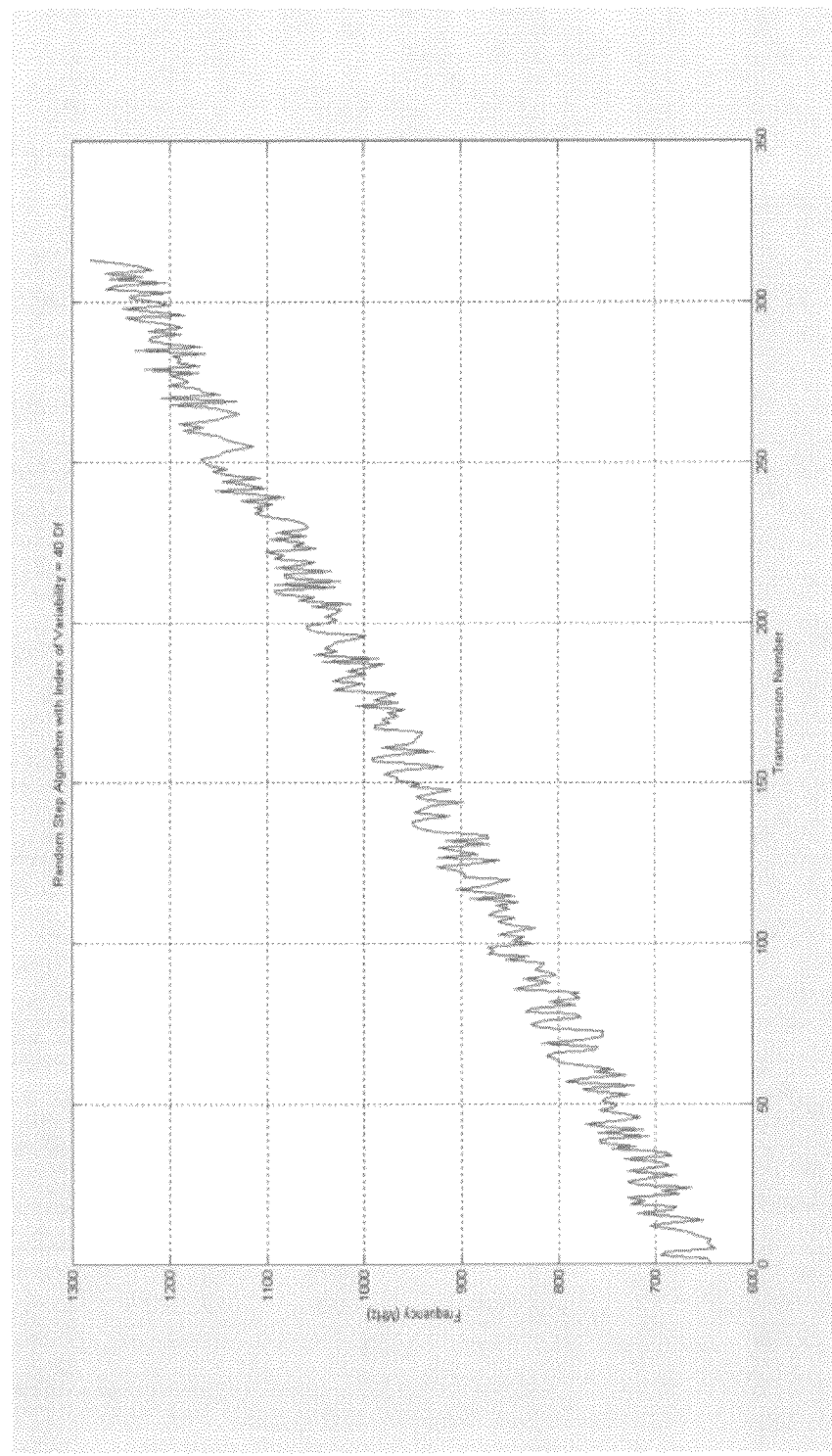
FIG. 5 illustrates a graphical representation of a frequency stepping waveform with a randomized step size to yield better temporal sidelobe performance.

Turning now to FIG. 5, illustrated is a graphical representation of a frequency stepping waveform with a randomized step size to yield better temporal sidelobe performance. The resolution of a SAR image is dependent on the angular extent of the views of the RFID tag. Seeing the RFID tag over a wide angular extent yields much higher resolution, but at the expense of long look times and indirectly, lower transmit antenna gain. Not knowing where the RFID tag is, a fairly broad antenna beam is beneficial with resultant low gain.

Thus, synthetic ranging can sharpen image by lowering the angular extent requirements and can extend detection range since it allows narrower beam transmit antenna halving the field of regard and doubling the range. Non uniform stepping can mitigate grating temporal lobes. The results may be improved with a mismatched filter ("MMF") approach and center weight energy distribution. Frequency hopping aspect makes the jamming system harder.

Regarding the filters, matched filters obtain best signal-to-noise ratio ("SNR") performance in a white Gaussian noise environment, but often at expense of large temporal sidelobes. In radar applications, large temporal sidelobes can be interpreted as false targets and in communications systems, they limit the ability to distinguish various multipath components when probing the channel response function. A waveform design that reduces temporal sidelobe levels is preferable. Binary phase shift keyed ("BPSK") waveforms combined with mismatched filter receivers specifically designed to lower temporal sidelobe levels would be beneficial.

Turning now to FIGS. 6 and 7, illustrated are matched and mismatched filter responses, respectively. A length five Barker code [1,1,1,−1,1] is transmitted using a BPSK signal format. In the matched filter response as a function of time, in addition to a large desired response, four large temporal sidelobes at a 20 log (1/5)=−14 decibel ("dB") level are present. In the mismatched filter responses, the finite impulse response ("FIR") filter tap values are [0,−1,2,−2,0,5,−8,5,8,5,0,−2,−1,0,0] with integer chip spacing. Now, peak sidelobe levels are at −30 dB, an improvement of 16 dB. Regarding SNR loss; the mismatched filter response only loses 0.6 dB at the correlation peak. This is because the mismatched filter design enhances (e.g., maximizes) output SNR, while at the same time reducing (e.g., minimizes) peak sidelobes; two opposing constraints. Ease of implementation is also a consideration in that filter taps were limited to three bit precision in this example.

Figure 8:
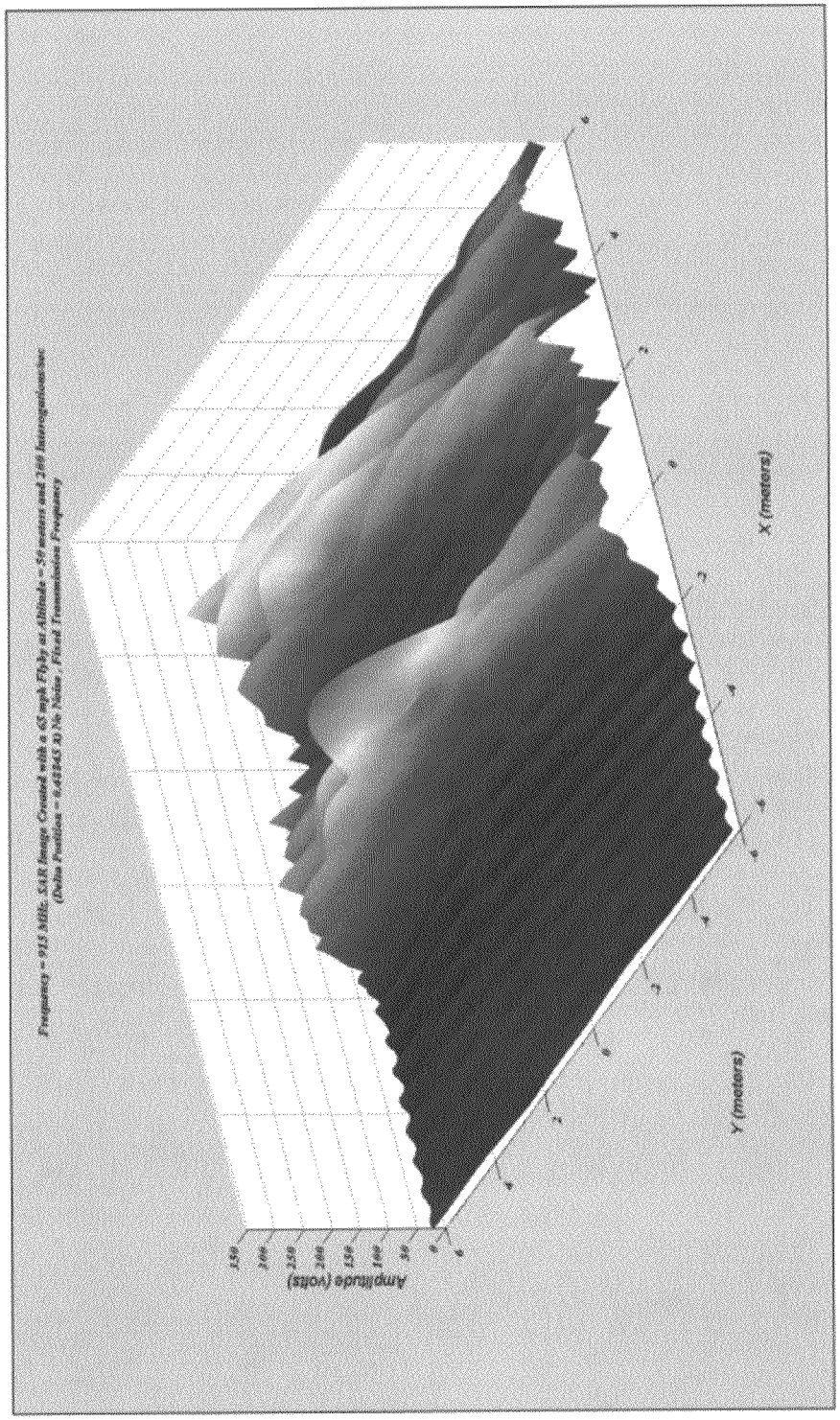
FIGS. 8 and 9 illustrate graphical representations of a synthetic aperture radar image associated with three RFID tags.
Figure 9:
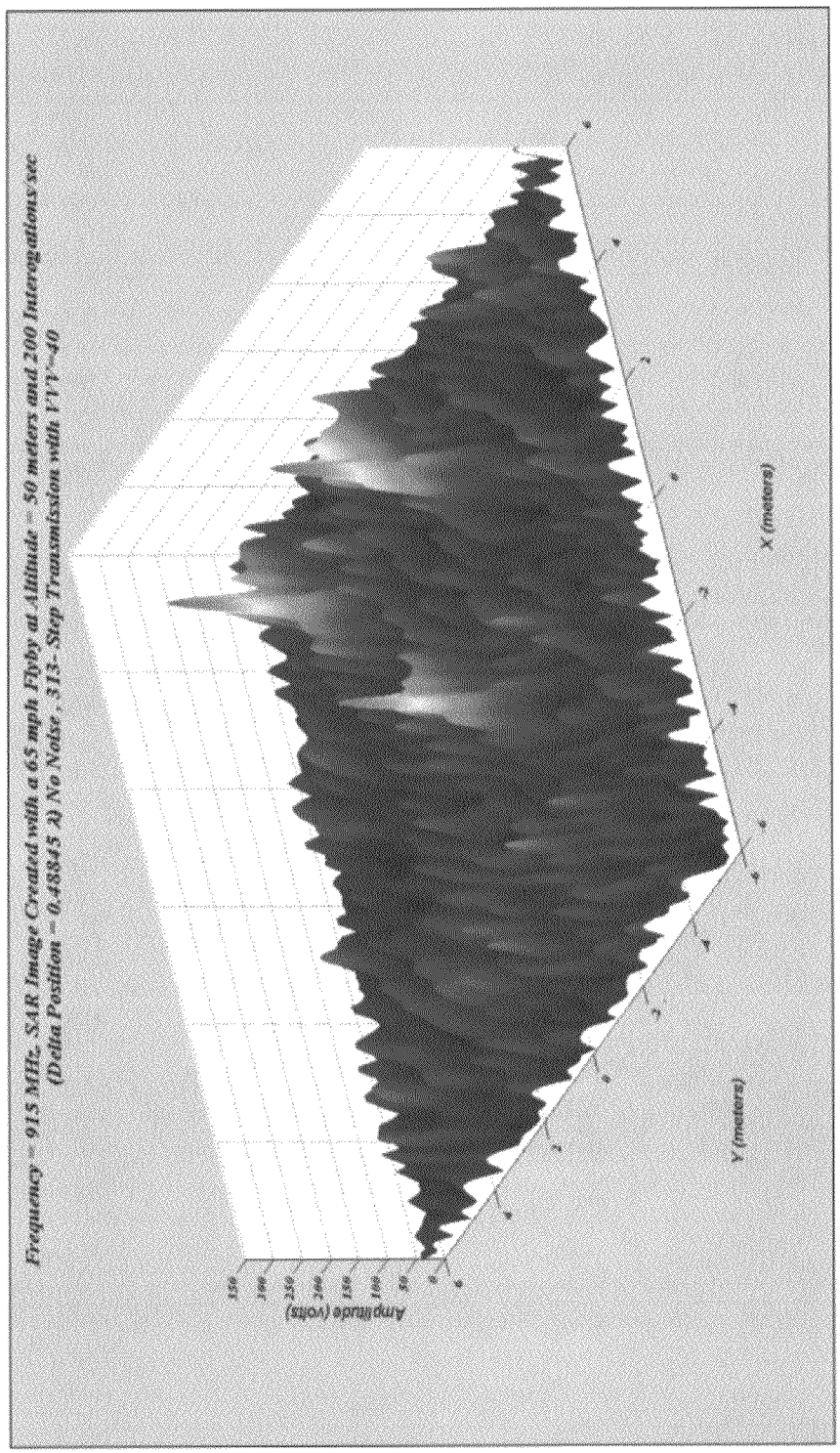

Turning now to FIGS. 8 and 9, illustrated are graphical representations of a synthetic aperture radar image associated with three RFID tags. FIGS. 8 and 9 show resultant SAR images without and with the stepped frequency waveform of FIG. 5. Synthetic ranging techniques using stepped frequency waveforms can be employed to sharpen the image and to mitigate SAR artifacts. In both cases, the reader is operating at 915 megahertz ("MHz") and moving at 65 miles-per-hour ("mph") at an altitude of 50 meters ("m"). The reader is performing 200 interrogations per second and the delta position is 0.48845 lambda.

Figure 10:
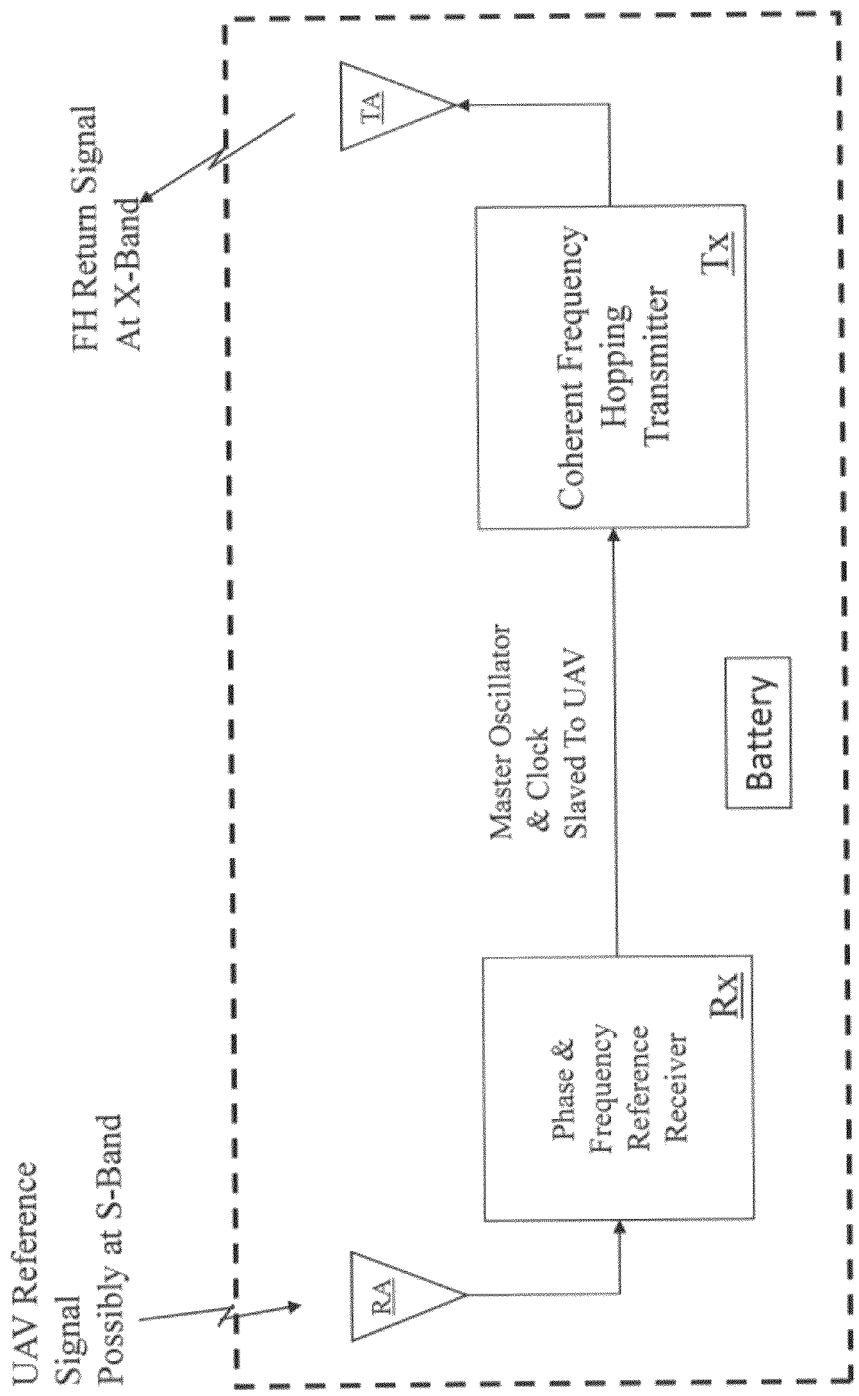
FIG. 10 illustrates a block diagram of an embodiment of an active RFID tag.
Figure 11:
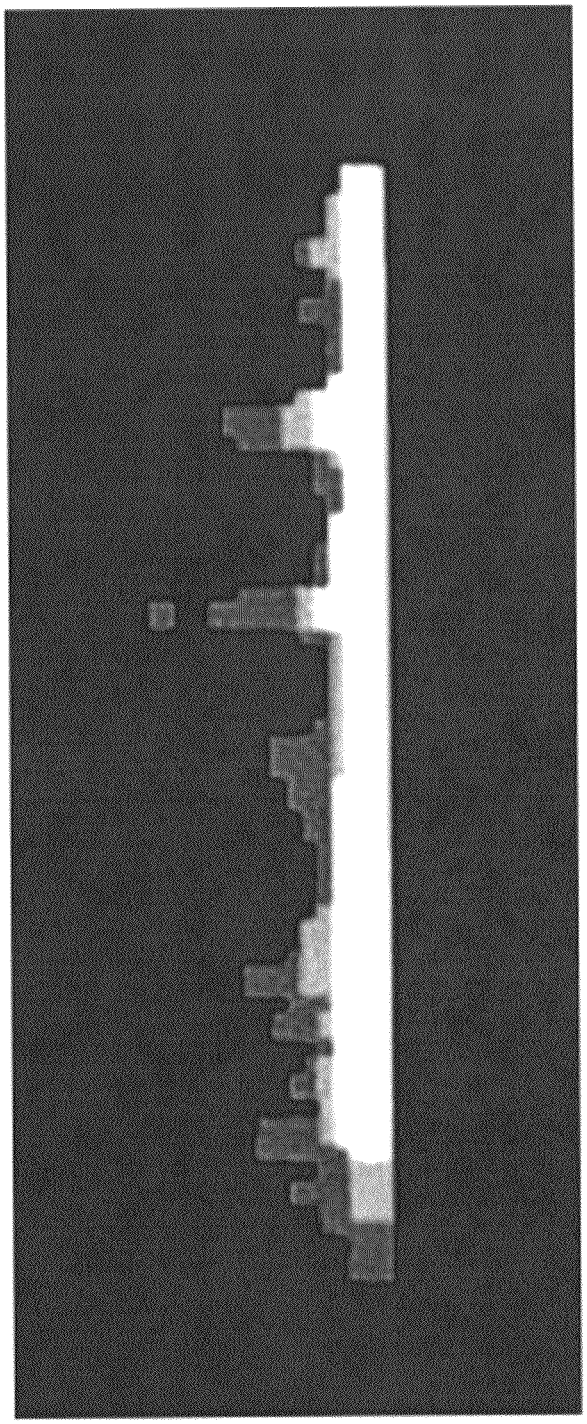
FIG. 11 illustrates a view of an embodiment of a radar silhouette of a ship produced with an inverse synthetic aperture radar processor.

Turning now to FIG. 10, illustrated is a block diagram of an embodiment of an active RFID tag. The active RFID tag receives a reference signal (e.g., an S-band reference signal) from, for instance, an unmanned aerial vehicle ("UAV") at a receiver Rx via a receive antenna RA. The reference signal provides a coherent reference for the active RFID tag via a low gain directional antenna (e.g., 3 decibels) and low transmit power (e.g., 0.25 watts). A transmitter Tx of the active RFID tag responds by sending a return signal (e.g., a frequency hopping return signal in the X-band) via a transmit antenna Tx to the UAV. Exemplary transmit powers for the active RFID tag for a frequency of 10 gigahertz ("GHz") are set forth below in Table I.

TABLE I

| Transmit Max Range (kilometers) | Transmit Duty Cycle (percent) | Reader Near Factor (decibels) | Rx Gain (decibels) | Pulse Sensitivity (decibels) | RFID Tag Gain (decibels) | Tx Power (milliwatts) |
|---|---|---|---|---|---|---|
| 6 | 0.1 | 5 | 3 | −3 | −2 | 12.81 |
| 12 | 0.1 | 5 | 3 | −3 | −2 | 51.23 |
| 6 | 1 | 5 | 3 | −3 | −2 | 1.28 |
| 12 | 1 | 5 | 3 | −3 | −2 | 5.12 |
| 6 | 10 | 5 | 3 | −3 | −2 | 0.13 |
| 12 | 10 | 5 | 3 | −3 | −2 | 0.51 |

Exemplary transmit powers for the active RFID tag for a frequency of 2.7 gigahertz ("GHz") are set forth below in Table II.

TABLE II

| Transmit Max Range (kilometers) | Transmit Duty Cycle (percent) | Reader Near Factor (decibels) | Rx Gain (decibels) | Pulse Sensitivity (decibels) | RFID Tag Gain (decibels) | Tx Power (milliwatts) |
|---|---|---|---|---|---|---|
| 6 | 0.1 | 5 | 3 | −3 | −2 | 0.93 |
| 12 | 0.1 | 5 | 3 | −3 | −2 | 3.73 |
| 6 | 1 | 5 | 3 | −3 | −2 | 0.09 |
| 12 | 1 | 5 | 3 | −3 | −2 | 0.37 |
| 6 | 10 | 5 | 3 | −3 | −2 | 0.01 |
| 12 | 10 | 5 | 3 | −3 | −2 | 0.04 |

While the active RFID tag includes an active transmitter, the semi-active RFID tags employ backscatter modulation (no active transmitter) to provide a return signal. Exemplary characteristics of a semi-active RFID tag are set forth below in Table III.

TABLE III

| Characteristics | X-Band (inches) | S-Band (inches) |
|---|---|---|
| Antenna Primary Aperture | 12 | 12 |
| Antenna Gain (decibels) | 30 | 18 |
| Transmit Power (watts at 10 percent Tx duty cycle) | 20 | 20 |
| Swath Width (kilometers) | 2 to 5 km offset | 3.5 to 5 km offset |

The following Table IV provides a comparison of active and semi-active RFID tags.

TABLE IV

| | Semi-active RFID Tags | Active RFID Tags |
|---|---|---|
| UAV Features | Size, weight and power requirements limit UAV candidates 12 inch antenna 20 watt transmitter at 10 percent duty cycle | Modest size, weight and power More UAV candidates |
| UAV Covertness | Impaired because of high effective radiated power ("ERP") Easy to detect interest (keep antenna directed to the target) | Reasonably covert |
| RFID Tag | Less complex design Sufficient size to obtain higher RCS S-Band RFID tag is physically larger RFID tag locally detectable | Higher power consumption and unit cost RFID tag is detectable during operation but coding assists |
| Coverage | X-band 2 km swaths at 5 km standoff range S-band 3.5 km swaths at 5 km standoff range Interleave scan to increase area search rate | 10 to 20 km wide swaths centered on UAV 12 km range |

Alternative embodiments comprehend the use of either passive, semi-active or active RFID tags. The passive RFID tags do not have a battery and rely on the incident signal to power the return signal therefrom. The active RFID tags have the advantage of further range but at the expense of having to have a battery and usually, greater cost. The active RFID tag generates a reverse link signal coherent with the reader's interrogation signal. The interrogator may phaselock to the incoming signal to generate a local reference and mix to another frequency for the reverse link.

The system as described herein accommodates low resolution search and high resolution track modes using SAR processing and dynamic flight path modification. The SAR processor may be located on a vehicle or elsewhere. The system can process backhaul raw analog-to-digital ("ADC") samples, preprocess and backhaul to a ground station, store mission data in memory for non real-time systems and the addition of a GPS receiver or transdigitizer on the RFID tag or as part of the system.

The reader (interrogator) as described herein can determine, if the RFID tags are at known positions, by its own position and velocity as it moves about by using SAR techniques combined with a triangulation process. By hypothesizing its own trajectory ($x_{READER}(t)$, $y_{READER}(t)$, $z_{READER}(t)$), the reader can arrive at a set of three or more phase trajectories according to the equations below and then test to see if they match responses from the RFID tags. If all of the phase trajectories common to the hypothesized reader trajectory yield a strong response, then the reader's location is identified. Once the track is established, a much smaller set of reader trajectory hypothesizes can be used.

$$\frac{2\pi}{\lambda}\sqrt{(x_{READER}-x_1)^2+(y_{READER}-y_1)^2+(z_{READER}-z_1)^2}=\theta_1$$

$$\frac{2\pi}{\lambda}\sqrt{(x_{READER}-x_2)^2+(y_{READER}-y_2)^2+(z_{READER}-z_2)^2}=\theta_2$$

$$\frac{2\pi}{\lambda}\sqrt{(x_{READER}-x_3)^2+(y_{READER}-y_3)^2+(z_{READER}-z_3)^2}=\theta_3$$

An alternative embodiment includes those applications where the RFID tags may be moving while the reader remains stationary. SAR techniques are again used to determine the RFID tag's location by using a set of hypothesized RFID tag trajectories and seeing which matches to produce a strong response. Such an approach will determine whether the RFID tag is entering or leaving a specific location. In an alternative embodiment, it is used in automated sorting equipment to decide when to open and close gates to direct the RFID tag (and the tagged object) to a particular destination.

In yet another embodiment, multistatic techniques are employed to enhance RCS, provide diversity channels, and enhance RFID tag localization by providing multiple look angles. Using a time and frequency source (e.g., GPS), interrogation transmitters and RFID tag response receivers can be coordinated so as to permit SAR processing with the transmitter and receiver at different locations. This bistatic mode has several advantages. It eases isolation problems associated with transmitting and receiving at the same frequency simultaneously, which is a particular problem for backscatter signal reception. Bistatic RCS is often much larger than monostatic RCS, particularly when the incident and reflection angles are similar. Having multiple receivers placed at separate locations provides diversity reception channels, thereby enhancing RFID tag signal reception.

In some applications, using the full set of SAR processing techniques is neither necessary nor practical. If the objective is merely to point to the RFID tag in order to find it, the following observations can be made. Moving towards the RFID tag yields advancing phase, moving away retards phase and, perpendicular motion yields no phase change. With these three hypotheses and a processing approach as described with respect to FIG. 1, the RFID system may be embodied in a handheld or weapons based interrogator that indicates which hypothesis fits best, namely, moving towards, away or perpendicular.

In yet another embodiment, an inertial measurement unit ("IMU") assisted reader located on the vehicle could read RFID tags as they pass by, perform SAR processing and then based on the RFID tag's identity and a database, make an assessment of position. Passive RFID tags could be embedded in the pavement every few feet, possibly as part of a paint striping operation. Then, a survey vehicle equipped with high end GPS/inertial technology (such as provided by Applanix) would map out the RFID tags and create a database that could be downloaded to vehicles or queried via radio. The advantage of such a system is that it could be precise (~5 centimeters ("cm")) and it would work in environments where GPS does not work such as in tunnels, parking structures, underpasses, etc., or even in GPS denied environments. It could be used to provide lane information as well that might be used in providing lane assignments. It would also be useful in accident reconstruction. In another embodiment, the UAV configuration would also include an inertial/SAR to map out tag locations and then convey the information to the weapon.

In yet another embodiment, readers are placed at known stationary locations to follow location of a vehicle using SAR techniques. The SAR aspect yields area coverage as opposed to "pass by a reader" coverage. This embodiment is useful in monitoring traffic and parking space usage. In an exemplary application, a ticket containing an RFID tag would allow the parking system operator to create a dynamic database showing where the vehicle is actually parked. This would be useful in assessing availability, finding lost vehicles, fraud detection and enforcing variable rate structures (e.g., certain parking locations cost more). This variant, when combined with a low cost RF transponder, provides location information to the vehicle or pedestrian carrying the appropriate RFID tag. Such a system could also be used to monitor prisoner locations, shopping cart trolley locations or pallet locations in near real-time. Active semi active variants are also possible to provide extended range. Yet another modification is to place an RFID tag on a vehicle or item that needs to be surreptiously tracked.

In yet another embodiment, RFID tags with known signatures are placed at surveyed locations. When the RFID tags are detected by the SAR processing, their apriori known locations are used in a dimensional map similar to that shown in FIGS. 3 and 6 along with a detected RFID tag whose position is not known. Using differential interpolating navigation techniques, the position of the unknown RFID tag can be determined with respect to the positions of the known RFID tags.

A synthetic aperture radar ("SAR") is a coherent mostly airborne or spaceborne often sidelooking radar system that utilizes the flight path of the platform to simulate an extremely large antenna or aperture electronically. Due to this long derived or 'synthetic' aperture, high-resolution remote sensing imagery is capable of being generated. Over time, individual transmit/receive cycles (e.g., in the form of pulse repetition time ("PRT") between subsequent pulses) are completed with the data from each cycle being stored electronically. The signal processing uses magnitude and phase of the received signals over successive pulses from elements of a synthetic aperture. After a given number of cycles, the stored data is recombined (taking into account the Doppler effects inherent in the different transmitter to target geometry in each succeeding cycle) to create a high resolution image of the terrain being over flown. FIG. 9 illustrates a view of an embodiment of a radar silhouette of a ship produced with an inverse synthetic aperture radar ("ISAR") processor. Inverse synthetic aperture radar is simply the same technique whereby the object, rather than the radar is moving. However, by the principle of reciprocity, the basic physics is the same.

Figure 12:
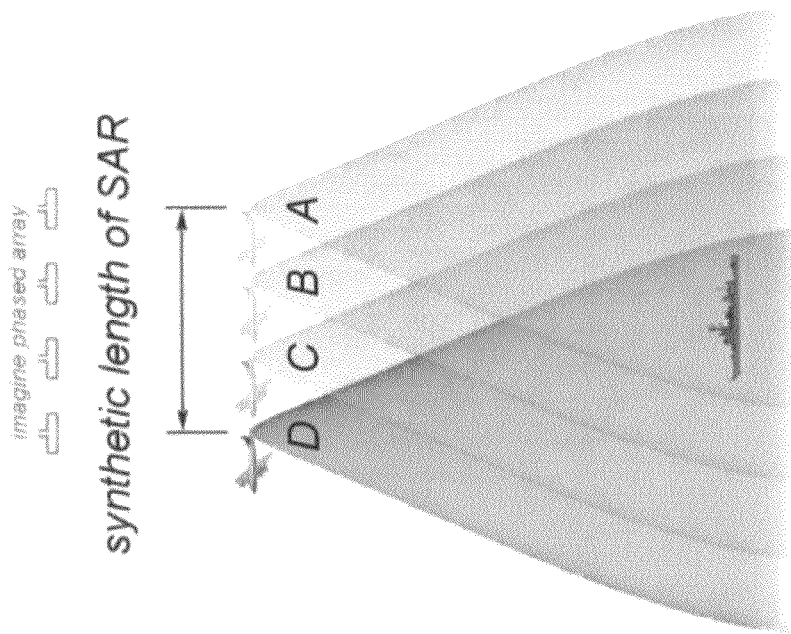
FIG. 12 illustrates a view of an embodiment of a synthetic length of a derived synthetic aperture radar antenna.

Turning now to FIG. 12, illustrated is a view of an embodiment of a synthetic length of a derived synthetic aperture radar antenna. Synthetic aperture radar works similar to a phased array, but contrary to the large number of parallel antenna elements of which a phased array is typically composed, SAR uses one antenna in time-multiplex. The different geometric positions of the antenna elements are the result of the moving platform as shown in FIG. 10.

A SAR processor stores the radar returned signals, as amplitudes and phases, for the time period T from position A to D. Now it is possible to reconstruct the signal which would have been obtained by an antenna of length v*T, where v is the platform speed. As the line of sight direction changes along the radar platform trajectory, a synthetic aperture is produced by signal processing that has the effect of lengthening the antenna. Making the time period T large makes the "synthetic aperture" large and hence a higher resolution can be achieved.

As a target (e.g., a ship) first enters the radar beam, the backscattered echoes from each transmitted pulse begin to be recorded. As the platform continues to move forward, the echoes from the target for each pulse are recorded during the time that the target is within the beam. The point at which the target leaves the view of the radar beam some time later, determines the length of the simulated or synthesized antenna. The synthesized expanding beamwidth, combined with the increased time a target is within the beam as ground range increases, balance each other, such that the resolution remains constant across the swath. The achievable azimuth resolution of a SAR is approximately equal to one-half the length of the actual (real) antenna and does not depend on platform altitude (distance).

Some exemplary features of synthetic aperture radar include a stable, fully coherent transmitter, an efficient and powerful SAR-processor and knowledge of the flight path and the velocity of the platform. Using this approach, systems have been constructed that achieve resolutions from airborne platforms that would be impractical, if not impossible using conventional radar processing.

Synthetic aperture radar is partnered by what is termed inverse synthetic aperture radar (again, ISAR) technology which in the broadest terms, utilizes the movement of the target rather than the emitter to create the synthetic aperture. Inverse synthetic aperture radars have been used aboard maritime patrol aircraft to provide radar images of sufficient quality to allow them to be used for target recognition purposes.

Figure 13:
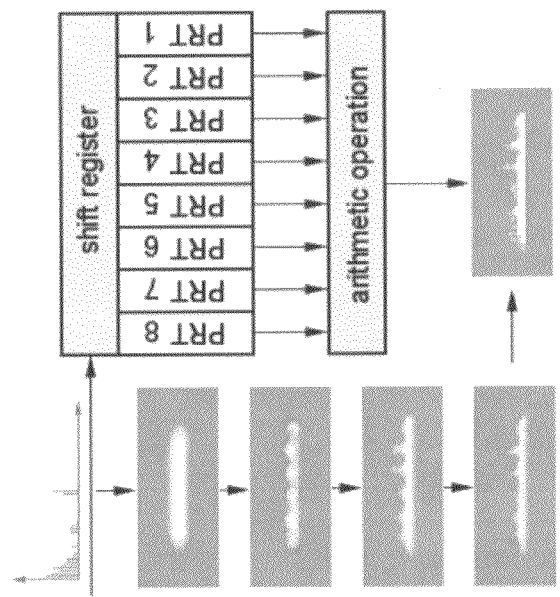
FIG. 13 illustrates a view of an embodiment of synthetic aperture radar processing.

Turning now to FIG. 13, illustrated is a view of an embodiment of synthetic aperture radar processing. In the illustrated embodiment, each pulse repetition time ("PRT") between subsequent pulses of transmit/receive cycles moves across a shift register as the SAR receiver moves. These snapshot radar images are then combined to form a SAR image. Accurate time and position is employed as the snapshots are combined coherently in phase and magnitude just as if the snapshots had been simultaneously impinged on a large multi-element array. For a better understanding of synthetic aperture radar and related processing, see "Synthetic Aperture Radar: Systems and Signal Processing," John C. Curlander, Wiley Series in Remote Sensing and Image Processing, November 1991 and "Digital Processing of Synthetic Aperture Radar Data: Algorithms and Implementation," Ian G. Cummings, Artech House Remote Sensing Library, January 2005, both of which are incorporated by reference.

Figure 15:
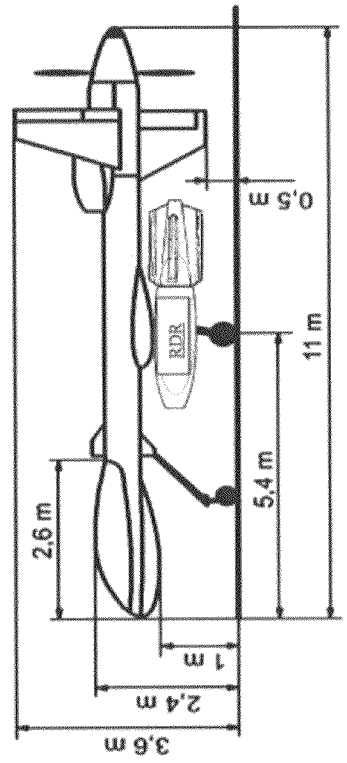
FIGS. 14 and 15 illustrate views of embodiments of vehicles including a reader.
Figure 14:
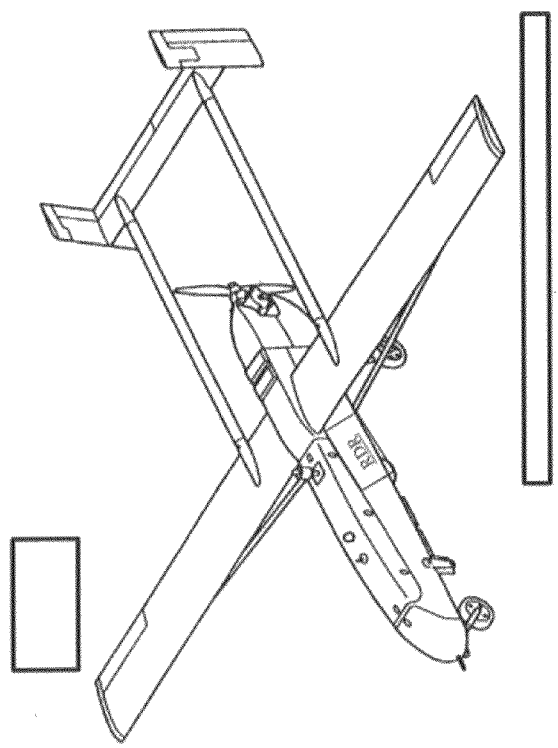

Turning now to FIGS. 14 and 15, illustrated are views of embodiments of vehicles (e.g., UAVs) including a reader (designated "RDR", or interrogator). In one embodiment, acquisition begins with a wide area search from a UAV. In other embodiments, acquisition can be incorporated using a number of theater and national assets including ground, airborne, and space based assets as well as the delivery vehicle or weapon itself.

The RFID system of FIG. 14 searches a wide swath with the searching antenna of the reader RDR on the side of the vehicle similar to a side looking SAR. This is beneficial if the position of the target (RFID tag) is not known apriori. Once the target (RFID tag) is identified, its position can be transferred to an onboard weapon (delivery vehicle), for example, a guided bomb. Alternatively, the receiver can be contained directly within the delivery vehicle.

In FIG. 15, the reader RDR is located on a guided bomb attached to the vehicle. The reader RDR can assist the guidance section to guide the bomb to a target (RFID tagged target). In a variation of this embodiment, the reader can be located within the weapon and the SAR processor can be in the vehicle (e.g., UAV). Thus, full SAR processing is possible prior to launch. However, post launch, the reader can still be used to home onto the target. This also has an added advantage of reducing weapon cost as the SAR processor is reusable. Yet another variant is to have the SAR processor remote from the weapon and available via a communications data link to the weapon.

The platform (e.g., UAV) acquires the RFID tagged target using SAR like signal processing and results in a three dimensional fix on the target. The position fix is accurate enough for guidance, even with a small warhead. Depending on launch platform, weapon(s) and size(s), the RFID system can be partitioned between the two vehicles. Any UAV may be employed with the RFID system including, without limitation, a Predator, Pioneer, Hunter, Global Hawk, Shadow 200, Fire Scout and Dragon Eye. The UAVs may include a tactical common data link to communicate information from the reader to another location. The tactical common data link may operate in the KU band with 200 kilo-bit-per-second forward command link and 10 mega-bit-per-second reverse link having a range of 150 nautical miles.

Figure 17:
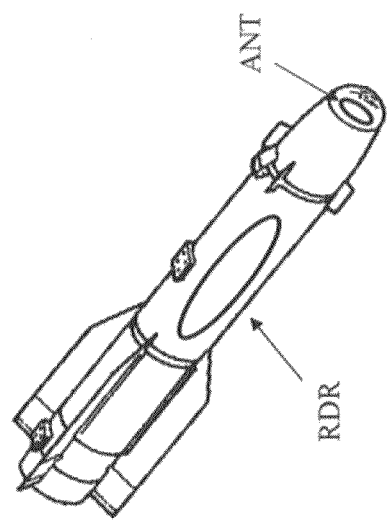
FIGS. 16 and 17 illustrate views of embodiments of a vehicle and a bomb, respectively, including a reader separated into multiple sections.
Figure 16:
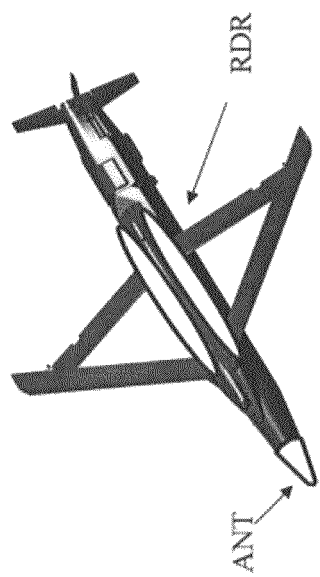

Turning now to FIGS. 16 and 17, illustrated are views of embodiments of a vehicle (e.g., UAVs) and a bomb, respectively, including a reader (designated "RDR", or interrogator) separated into multiple sections. As shown in FIGS. 16 and 17, an antenna (designated "ANT") of the reader RDR is located on the nose of the UAV and bomb, respectively. In FIG. 14, the reader RDR is further bifurcated into two subsystems. Additionally, a SAR processor of the reader RDR may be located remote from the UAV and communicate therewith via a tactical common data link. The antennas may be slip-on sleeve antennas for kit weapons. The terminal guidance are weapon and mission dependent and include pure inertial guidance to last known point, use of a forward aperture and/or deviated flight path and active verses semi active seeking.

Exemplary transmit powers and search rates for a UAV at a 50 meter altitude are set forth below in Table V.

TABLE V

| Reference Data | | | | |
|---|---|---|---|---|
| Range (feet) | 29.50 | 29.50 | 29.50 | 29.50 |
| Range (meters) | 8.99 | 8.99 | 8.99 | 8.99 |
| Tx Power (watts) | 0.10 | 0.10 | 0.10 | 0.10 |
| Transmit Power | | | | |
| Propagation Exponent | 2.00 | 2.00 | 2.00 | 2.00 |
| Desired Range (meters) | 100.00 | 150.00 | 200.00 | 250.00 |
| Increase in Tx Power (time ref.) | 123.69 | 278.30 | 494.75 | 773.05 |
| Transmit Power (watts) | 12.37 | 27.83 | 49.48 | 77.30 |
| Swath Width | | | | |
| UAV Altitude (meters) | 50.00 | 50.00 | 50.00 | 50.00 |
| Slant Range (meters) | 100.00 | 150.00 | 200.00 | 250.00 |
| One Sided Swath Width (metes) | 86.60 | 141.42 | 193.65 | 244.95 |
| Two Sided Swath Width (metes) | 173.21 | 282.84 | 387.30 | 489.90 |
| Two Sided Swath Width (miles) | 0.11 | 0.18 | 0.24 | 0.30 |

TABLE V-continued

| Search Speed | | | | |
|---|---|---|---|---|
| Forward Speed (mph) | 65.00 | 65.00 | 65.00 | 65.00 |
| Search Rate (square mph) | 7.00 | 11.42 | 15.64 | 19.79 |

Of course, the transmit power will vary depending on the factors (such as a change in altitude) associated with a particular UAV. It should also be noted that any vehicle may be employed with the system herein.

Thus, SAR-like processing can assist with mapping out unexploded ordinance or any other tagged objects. The resolution depends on observer trajectory and interrogation rates. The trajectory patterns can be dynamically optimized. The interrogation patterns can be dynamically optimized based on SNR, number of RFID tags and beam steering capabilities. The processing techniques are tolerant of noise via joint SAR/detection techniques that yield improved detection performance and real time kinematic GPS processing to yield position to about two centimeters.

Figure 18:
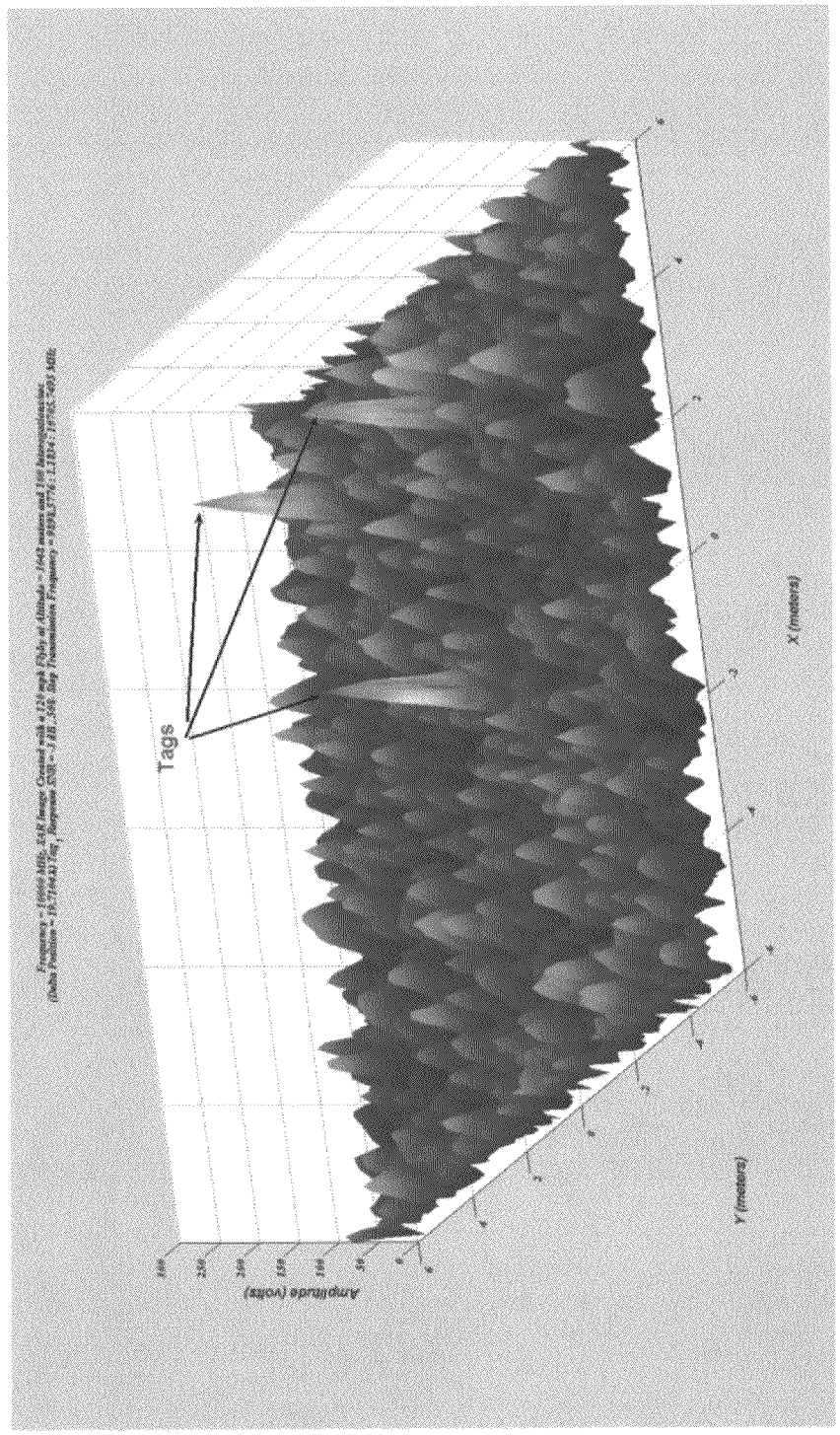
FIGS. 18 to 20 illustrate graphical representations of a synthetic aperture radar image associated with three RFID tags.

Turning now to FIG. 18, illustrated is a graphical representation of a synthetic aperture radar image associated with three RFID tags. This FIGURE shows an X-band system with 800 MHz frequency hop spread. The three RFID tags are all detected at four meters apart. The processing scheme was a based on a five second/300 meter aperture at −3 dB SNR. The detection is tens of decibels above the clutter, wherein the system discriminates each RFID tag from the other, and from the background. The reader is operating at 10,000 megahertz ("MHz") and moving at 120 miles-per-hour ("mph") at an altitude of 3048 meters ("m"). The reader is performing 100 interrogations per second and the delta position is 19.7104 lambda.

Figure 19:
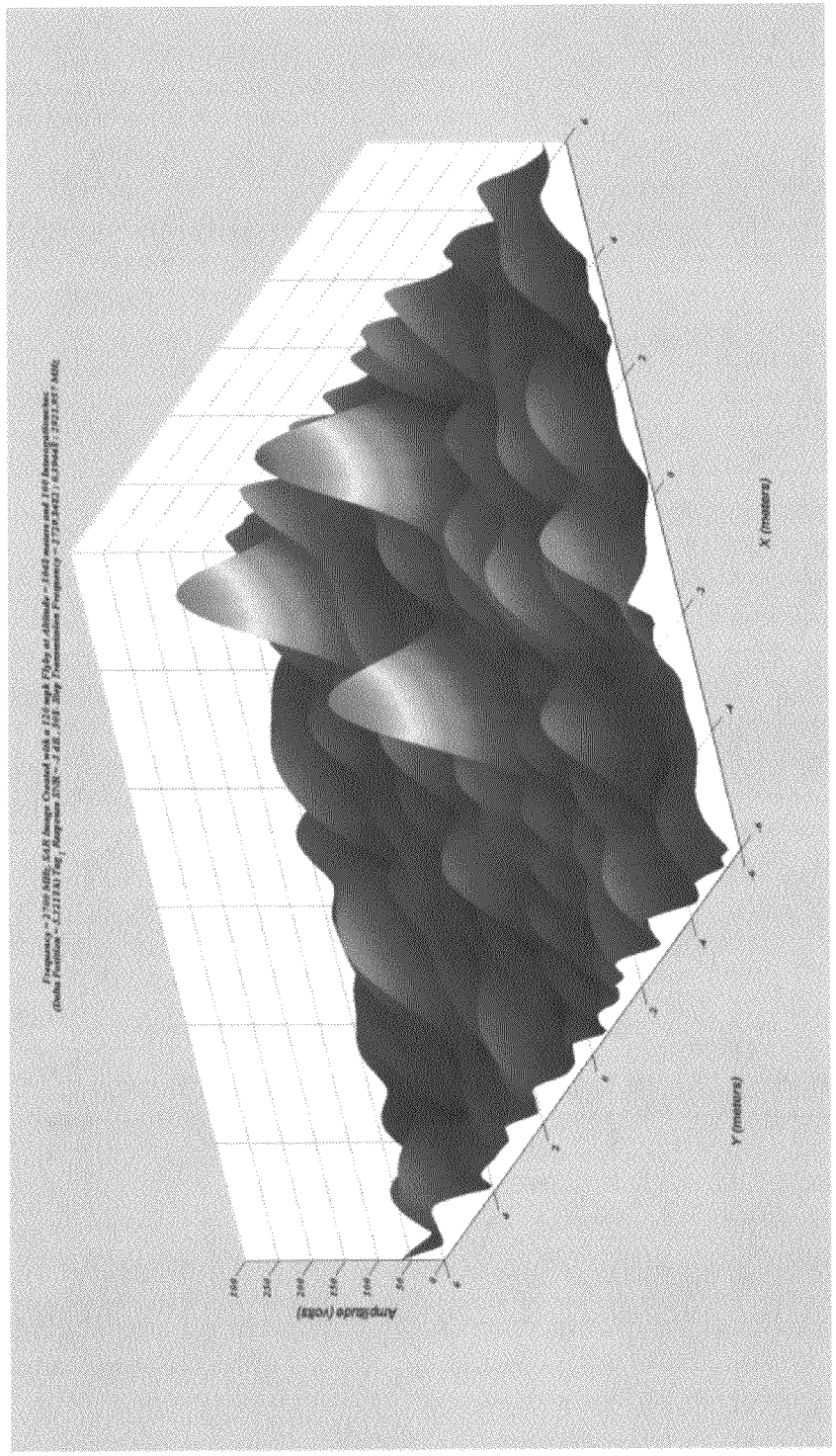

Turning now to FIG. 19, illustrated is a graphical representation of a synthetic aperture radar image associated with three RFID tags. This FIGURE shows an S-band system. As expected with the longer wavelength, resolution is not as good as X-band system, but is acceptable to deliver even small warheads. In this case the system used a 200 MHz frequency hop spread at 2700 MHz. The reader is operating at 2700 megahertz ("MHz") and moving at 120 miles-per-hour ("mph") at an altitude of 3048 meters ("m"). The reader is performing 100 interrogations per second and the delta position is 5.3218 lambda.

Figure 20:
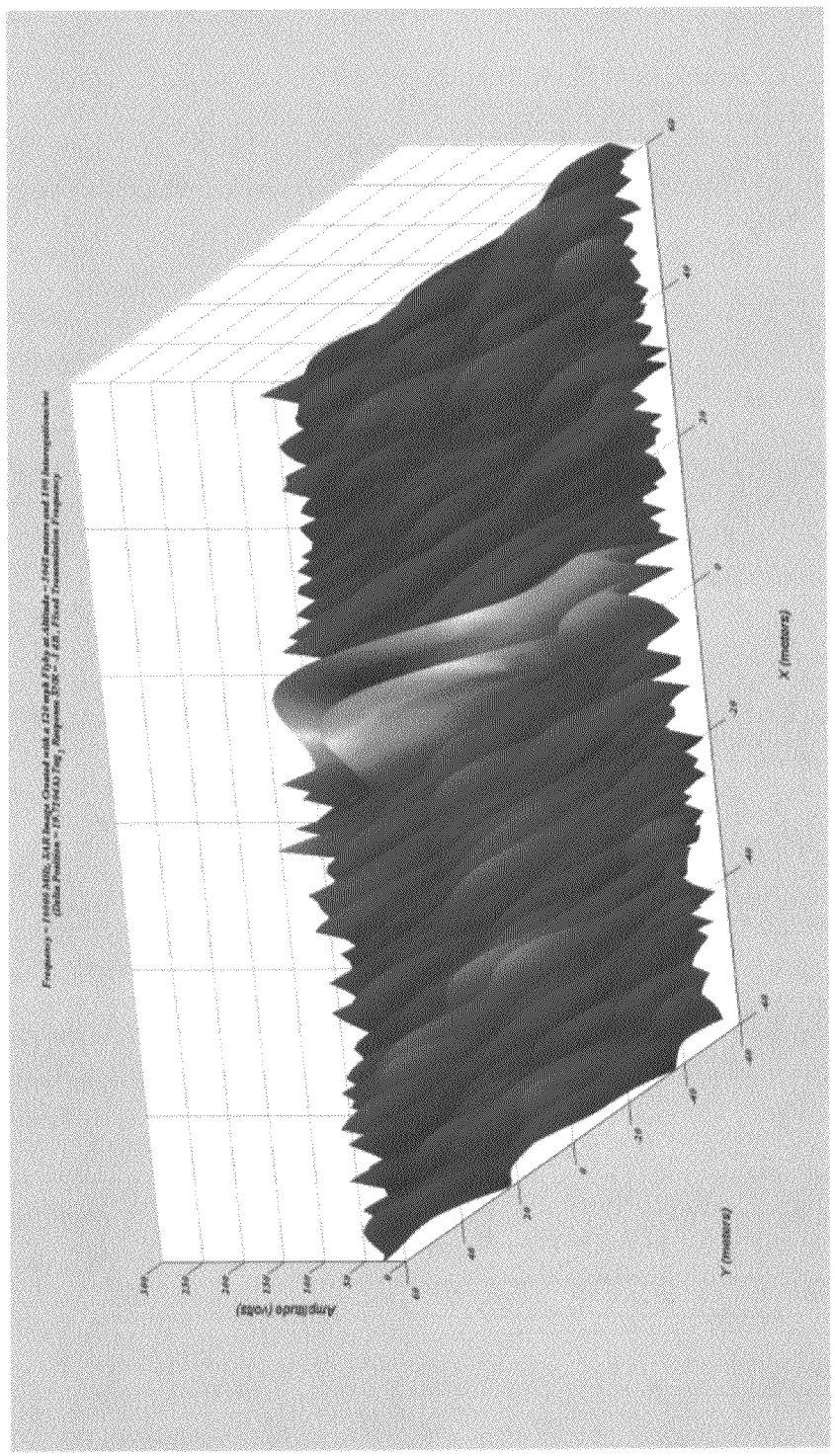

Turning now to FIG. 20, illustrated is a graphical representation of a synthetic aperture radar image associated with three RFID tags. This FIGURE shows the results of an X-band system associated with an initial wide area acquisition mode for quickly searching large portions of potentially interesting areas. This approach is very efficient at looking at large areas and can be used in an initial wide area acquisition mode. This mode provides potential for a wide area acquisition mode, supporting larger swaths of search area. Subsequent to this, a narrower acquisition mode may be chosen, if necessary, based on the information obtained from this initial search. The reader is operating at 10,000 megahertz ("MHz") and moving at 120 miles-per-hour ("mph") at an altitude of 3048 meters ("m"). The reader is performing 100 interrogations per second and the delta position is 19.7104 lambda.

During initial target acquisition, there may be considerable uncertainty with regards to target position. This may necessitate large processing resources and or use of lower resolution waveforms/lower resolution waveform processing approaches. Once the target(s) are found, the system can enter a track mode wherein the reduced uncertainty in target location is used advantageously. This can be in the form of reduced processing requirements and/or through the use of a higher resolution waveform. For weapons guidance, approximate target coordinates may be handed off to the weapon which performs SAR image formation using a reduced uncertainty and possibly with an enhanced resolution waveform/waveform processing approach.

Alternatively, the target acquisition system, optionally located on a UAV, may operate in a track/acquisition mode wherein it may track target(s) using enhanced resolution while simultaneously engaged in search and acquisition process(es). Here simultaneous may imply time interleaved operation wherein waveforms switch modes depending on whether the system is in acquisition or track sub modes. The system may employ an interleaved operation in which target(s) are tracked whilst also looking for others.

Any information with regards to target location may be used to reduce processing requirements. If, for instance, the target is known to be on the ground or at a particular altitude above ground level (e.g., third floor), then a map containing elevation location can be used to reduce the range of possible target locations and thus limit processing requirements. A digital topographic map would be one example of such a map but other possibilities exist such as a synthetic aperture radar generated map. Cuing from optical or radar systems tracking the target may also be of utility to reduce the possible target locations/velocities window. As an example, general moving target indicator ("GMTI") radar can cue the SAR-like processing techniques as could an optical range/bearing system.

The radar responsive RFID tag may cooperate with the interrogator by seeking to enhance its radar cross section ("RCS") in the direction of the interrogator(s). For monostatic modes with a passive or semi-active tag, one such technique would be to employ an array of antenna elements in the RFID tag, measure relative carrier phase upon reception, and adjust backscatter phases of individual elements so as to enhance the RCS in the direction of the interrogator. For active RFID tags, which transmit, a similar concept could be employed wherein relative phases of transmission of individual elements could be adjusted to enhance the gain back towards the interrogator. In an extension of the concept, instead of adjusting phases, time delays may be adjusted to provide better wide bandwidth capabilities.

For bistatic modes, wherein emanations from the RFID tag are not received at the same location as from which they are received; the RFID tag may be informed of direction offsets and seek to enhance the RCS/gain in the direction of the intended receiver(s). In one embodiment, the interrogator transmitting to the RFID tag could convey offset information to the RFID tag via data aspects in its transmission waveform. The RFID tag upon demodulating this information could adjust phases accordingly.

Under normal circumstances, SAR-like image formation benefits from good location and inertial measurement unit data. Lesser quality data may be acceptable by using multiple RFID tags and/or interrogators to create SAR-like images and so determine the locations of the RFID tag(s). This may in fact permit operation in GPS denied environments. This is because, if there are multiple RFID tag(s) and/or interrogators at known relative locations, additional unknown variables may be solved for. As an example; if one RFID tag is placed on the target and another is placed at a known offset with respect to the first, the weapon can solve for its own relative position. One possible method would be to employ an array of hypothetical "own trajectories" and determine which one permits simultaneous good SAR-like focus on both RFID tags.

Extending the concept, additional RFID tags at known relative locations could be used to improve the relative position/relative trajectory solution.

In some cases, all RFID tags may be offset with respect to the weapon aim point. As an example, one or more RFID tags may be placed at known offsets with respect to the weapon aim point. This obviates the need to gain physical access to the aim point, and it permits for relative position strike options (e.g., close air support). An additional benefit of the above approach is that SAR-like image resolution in the azimuthal direction is dependent on relative trajectory between the interrogator and the RFID tag. If the interrogator proceeds directly to the RFID tag, then the synthetic aperture is small and poor azimuthal resolution is the result. With multiple RFID tags and/or interrogators at dispersed locations, there is improved likelihood of obtaining good SAR-like azimuthal resolution even though some pairings offer poor resolution.

Figure 21:
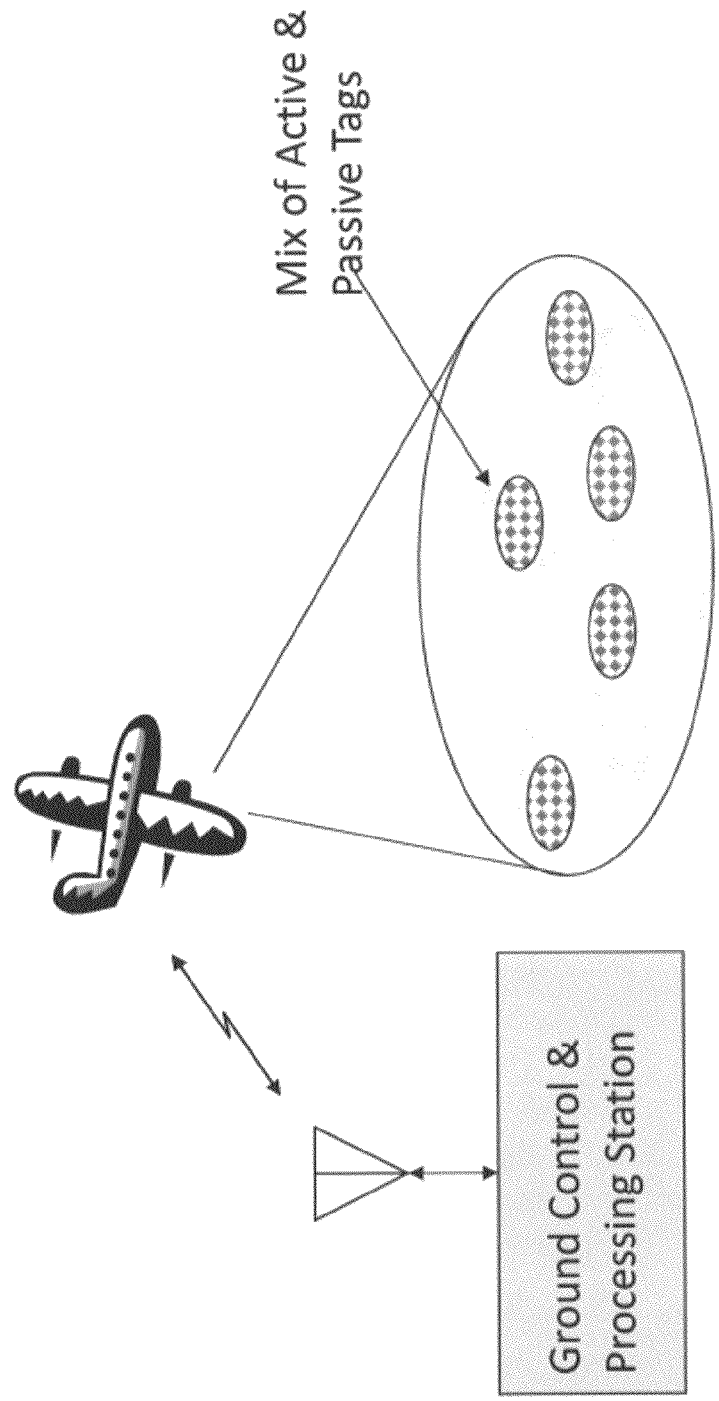
FIG. 21 illustrates a view of an embodiment of a system to locate RFID tags with synthetic aperture radar processing.

Turning now to FIG. 21, illustrated is a view of an embodiment of a system to locate RFID tags with synthetic aperture radar processing. The system integrates UAV operations with SAR processing to locate the RFID tags. In one embodiment, the RFID tags are attached to unexploded ordinance ("UXO") and the UAV is flying in a low and slow trajectory to locate and map the unexploded ordinance. Other variations such as locating missing personnel and locating lost items in a warehouse (e.g., a ground mobile version).

The system uniquely locates passive, semi-active or active RFID tags using the signals returned from the RFID tag(s) to be processed by SAR-like processing techniques in space. The use of multiple different types of tags is comprehended. The system has the ability to resolve simultaneous tags, which lowers the dependence on orthogonal coding resolution techniques. This results in a much greater number of unique codes that can be used.

The system as described herein recognizes that there are multiplexing tradeoffs associated therewith. In an embodiment, an upper limit auto-ID interrogation rate is about 500 interrogations-per-second ("IPS") with one millisecond ("msec") interrogation followed by 0.627 msec tag response. The SAR image resolution is based on obtaining multiple perspectives. The interrogation rate is a function of vehicle speed and the SNR. The system can use lower interrogation rates to save power (use smaller vehicle), to do beam steering to raise the equivalent isotropically radiated power ("EIRP") on hard to trigger tags and to partition tag responses and mitigate near/far problems. The lower interrogation rates and/or tag response SNR tend to lower the resolution of the SAR image. The parameters can be selected to meet the requirements of a particular application.

Turning now to FIG. 22, illustrated is a view of an embodiment of a RFID system. The RFID system includes a reader or interrogator (a RFID correlating/SAR processing transceiver) RDR and a RFID tag (designated "TG"). The reader RDR is typically vehicle mounted (airborne or ground) and moving to achieve SAR capability. The RFID tag TG is in a fixed location or attached to a moving object. Thus, the reader RDR is configured to detect the RFID tag TG either statically mounted or on a moving vehicle as well. The correlation of a return signal from the RFID tag TG at the reader RDR achieves greater detect sensitivity thereof. The RFID tag TG can be passive, semi-active or active. During and after RFID tag TG detection, SAR processing of the return signal(s) allows the reader RDR to determine a location thereof. This consists of time and vehicle location tagging of the detected return signal(s), both individually and collectively.

Turning now to FIG. 23, illustrated is a view of an embodiment of a RFID system. The RFID system includes first and second readers or interrogators (RFID correlating/SAR processing transceivers) RDR1, RDR2 and a RFID tag (designated "TG"). The readers RDR1, RDR2 are typically vehicle mounted (airborne or ground) and moving to achieve SAR capability. The RFID tag TG is in a fixed location or attached to a moving object. The readers RDR1, RDR2 work cooperatively wherein a first reader RDR1 activates the RFID tag TG and both readers RDR1, RDR2 receive the return signal(s) from the RFID tag TG. The information is then combined to improve the reliability of the location of the RFID tag TG.

As above, the readers RDR1, RDR2 are configured to detect the RFID tag TG either statically mounted or on a moving vehicle as well. The correlation of a return signal from the RFID tag TG at the readers RDR1, RDR2 achieves greater detect sensitivity thereof. The RFID tag TG can be passive, semi-active or active. During and after RFID tag TG detection, SAR processing of the return signal(s) allows the readers RDR1, RDR2 to determine the location thereof. This consists of time and vehicle location tagging of the detected return signal(s), both individually and collectively.

Figure 24:
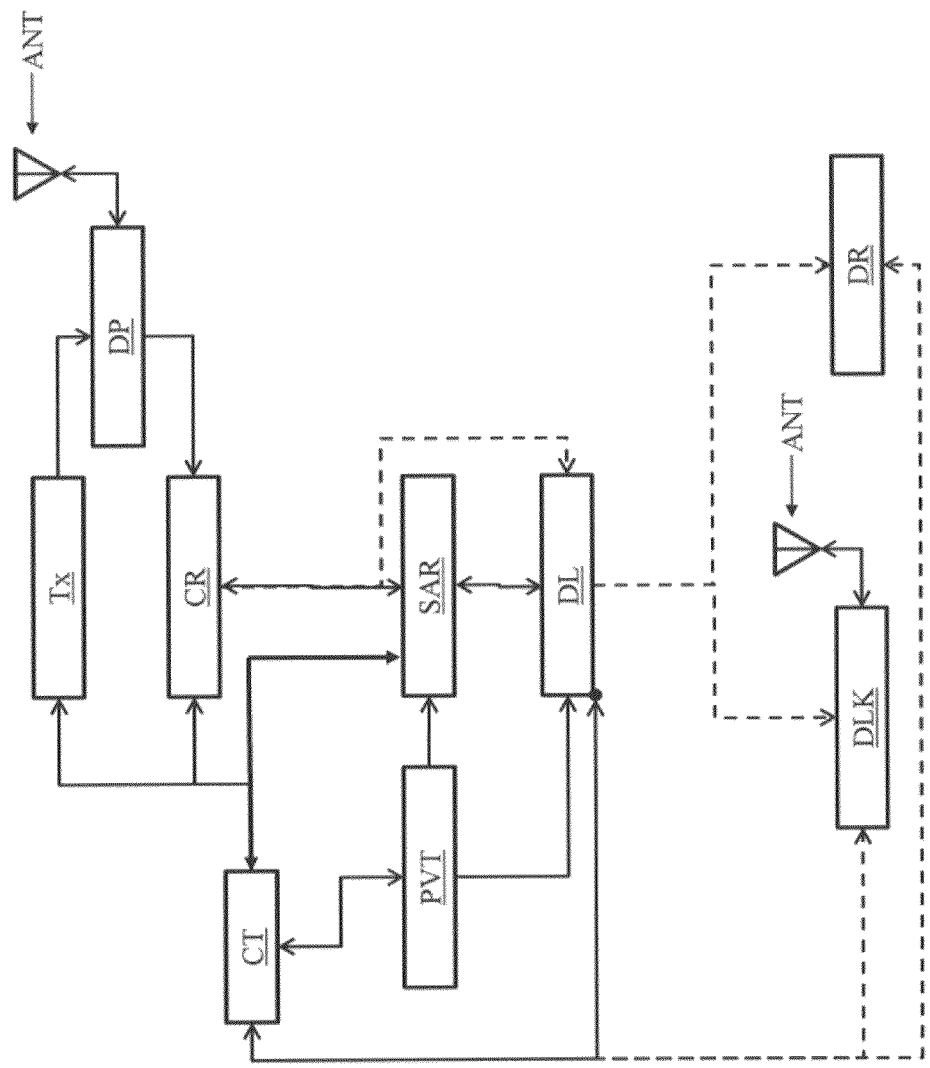
FIG. 24 illustrates a view of an embodiment of a reader.

Turning now to FIG. 24, illustrated is a view of an embodiment of a reader or interrogator (a RFID correlating/SAR processing transceiver). The reader includes a controller CT configured to provide overall event scheduling, timing and directed processing. A transmitter Tx is configured to send a coded (modulated) signal (an interrogation signal) consistent with a RFID tag being deployed at the transmitting frequency through a diplexer DP and onto an antenna ANT where it is transmitted through space. The antenna ANT is a single element design with a well defined and stable azimuth and elevation beamwidth to produce signals suitable for SAR processing.

A receiver such as a correlating receiver CR controlled by the controller CT performs a correlation function on a return signal from the RFID tag and based on the type of RFID tag deployed, may be either a homodyne or a heterodyne receiver. If the RFID tag is passive, or semi-active, the correlating receiver CR is typically homodyne. If the RFID tag is active, the correlating receiver CR may be either homodyne or heterodyne. The output of the correlating receiver CR is a digital signal sent to a processor such as a SAR processor SAR.

The SAR processor SAR accepts inputs from the correlating receiver CR, a sensing module such as a position, velocity, time sensing module PVT and the controller CT. As discussed previously, the SAR processor SAR processes the data from the correlating receiver and the antenna ANT as though it were a continuous antenna of very considerable length that is defined by the vehicles path in space that contains the reader.

The position, velocity, time sensing module PVT obtains and outputs position of the reader, velocity of the reader, and time data (associated with the return signal from the RFID tag) of sufficient accuracy to the SAR processor SAR. Using the information from the position, velocity, time sensing module PVT and the information from the correlating receiver CR, a "synthetic aperture array" antenna is constructed with the property of enhanced resolution to locate a position of the RFID tag that would be achieved were this array to actually exist in physical form. Thus, the SAR processor SAR employs synthetic aperture radar processing on the aforementioned information (including the return signal via the correlating receiver CR) to locate a position of the RFID tag. A common embodiment of this function is to use a NAVSTAR GPS receiver. Other embodiments such as atomic clocks and highly accurate inertial systems are also possible including integrated systems consisting of GPS and inertial systems integrated to provide a single solution. It should be noted that the correlating receiver CR and/or the SAR processor SAR may include a filter (such as the mismatched filter described above) to further enhance a resolution of the position of the RFID tag.

A data logger DL accepts the time RFID tagged data from the SAR processor SAR, and the position, velocity, time sensing module PVT and is controlled by the controller CT. The data logger DL logs all relevant data for any post processing and analysis. Alternatively, or in addition, a data link may be provided via an antenna ANT, which may be a real-time link or batched as necessary. As an alternative, the SAR processing may be external to the vehicle carrying the reader. In this instance, the time and position tagged RFID data is data linked for SAR processing at a remote site. The results could then be returned to the vehicle via the data link. In another embodiment, a data recorder DR records the time tagged RFID data for SAR processing at a later time.

The transmit and receive frequencies chosen may be determined by, but are not limited to, any frequencies currently in use with RFID tags. This RFID system comprehends the use of other frequencies chosen specifically to optimize the system's performance. This RFID system also claims the benefits of apriori RFID tag knowledge wherein identifying certain RFID tags also identifies the object attached thereto. The RFID system claims the use of unique identifying codes including, but not limited to, orthogonal codes (e.g., Walsh codes or Kasami sequences) to improve resolution and RFID tag discrimination. The RFID system may use encrypted codes or other processing techniques such as, but not limited to, code division multiple access ("CDMA") or spread spectrum techniques to limit or avoid detection.

The RFID system may also employ multiple RFID correlating/SAR processors operating in a cooperative manner to achieve greater accuracy of the RFID tag's location. In this embodiment, the data may be combined to reduce or eliminate portions of the data missing or having low quality. Also, post processing or the benefit of a data link sufficient for cooperation is employed. Multiple readers acting in concert may have advantages in certain situations. These multistatic systems can exploit diversity techniques to extend range. Also, radar cross section ("RCS") is angle dependant and may be enhanced through bistatic operation where the transmitting reader and the receiving reader are at different locations.

The RFID system may employ multiple tags and the system has the capability to query a single RFID tag and, in that instance, all other RFID tags remain silent, whether active or not. Of course, when multiple tags are present, ones of or all of the multiple tags may respond. In this manner, the vehicle can determine the location of multiple tags simultaneously. Applications include, but are not limited to, discrimination of RFID tags according to being friendly or hostile, and relative locations with respect to each other. In yet another embodiment, multiple tags at known locations may provide geodetic information to a vehicle in those instances when GPS is denied. In such an instance, the RFID tags locations, once determined, can be used to derive the vehicle location via standard triangulation techniques.

The RFID system may operate in different operational modes. In a RFID tag active mode, the RFID tag enters a mode whereby it will respond if properly queried. In an acquisition mode, the RFID tag initially responds to the reader and, in a data taking mode, the RFID tag provides sufficient data for SAR processing to locate the position of the RFID tag. In a track mode, the signal processing continuously tracks the RFID tag. This could occur during a weapon launch as a result of the detection of the location of the RFID tag and the weapon homes onto the RFID tags return signal(s).

Also, if the RFID tag(s) are moving (e.g., on an automobile, truck, or boat) the reader can be stationary and still determine RFID tag positions. The relative motion between the reader and RFID tag(s) allows the SAR-like processing techniques to localize the position of the RFID tag(s).

Also, frequency-hopping waveforms (e.g., stepped frequency) can also be advantageously employed, reducing the level of certain SAR processing artifacts and improving resolution. The RFID system may integrate SAR processing with other technologies (e.g., cell tower triangulation and GPS/inertial integrated navigation) for increased accuracy and/or robustness. Additionally, the RFID tag may be identified when only a partial signature can be decoded.

Figure 25:
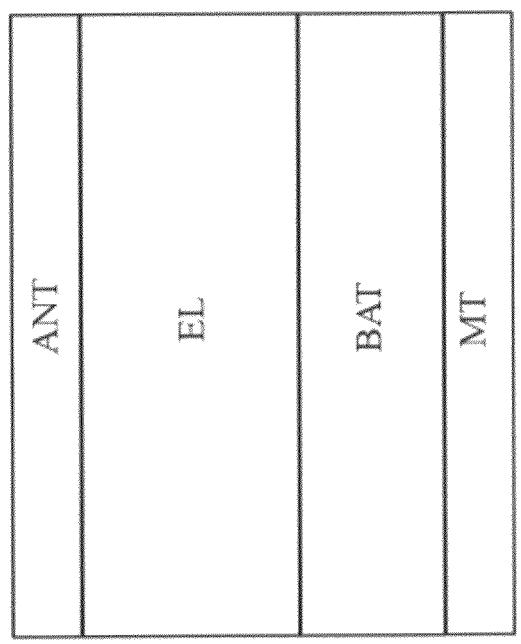
FIGS. 25 and 26 illustrate views of an embodiment of a RFID tag.
Figure 26:
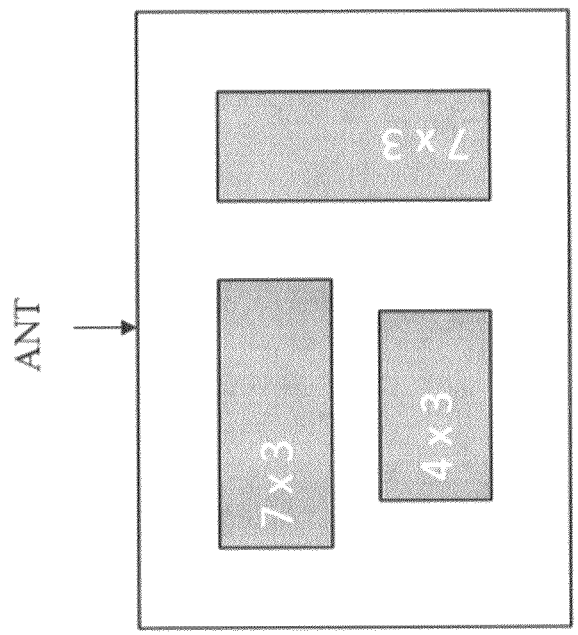

Turning now to FIGS. 25 and 26, illustrated is a view of an embodiment of a RFID tag. The RFID tag includes an antenna ANT, electronics EL, a battery BAT and a mount MT. The electronics EL include a communication element (e.g., receiver, transmitter and/or transceiver) and a processing function. The battery BAT may be connected to an external power source. The mount provides any material or construction (e.g., adhesives, mechanical mounts and/or magnets) to mount the RFID tag onto a desired object to be tracked. While the illustrated embodiment provides an active RFID tag operating at 2.4 gigahertz, passive, semi-active, and active tags operating at other frequencies may be used as well. Of course, any operating frequency may be employed with the RFID system. Exemplary dimensions of the RFID tag are 16 mm×12 mm×12 mm. As illustrated in FIG. 26, the antenna ANT employs two linear fractal antennas configured to provide a circularly polarized signal (90 degree phase and delay) plus a matching network on a ceramic substrate. Exemplary dimensions for the elements of the antenna ANT are illustrated on the FIGURE. It should be noted that the RFID tag is constructed in layers to accommodate a compact design.

This RFID system may include standard RFID tags or custom RFID tags developed for use with correlating/SAR processing. Typically an encoded signal from the reader will initiate the function whereby the RFID tag will respond in the event the encoded signal is correct. The RFID tag may become active or able to respond to a query based on a predetermined time, or when an activating signal (interrogation signal) is first transmitted or at some time after the activating signal is transmitted. The activating signal can be unique and need not be part of the RFID standard interface specification. The RFID tag may also come alive at predetermined times for a period of time to see if a reader is present and then return to an inactive mode if no reader is present.

The RFID tag may become active due to the occurrence of any event including non-electromagnetic events. These include, but are not limited to, events such as movement, incident light, sound, temperature, presence of a non-related electromagnetic signal, or related activating signal, or any relevant external activity indicating the RFID tag should become active. Of course, the RFID system may integrate sensors to implement these functions. If a passive RFID tag is used, the incident transmitted energy should be sufficient to charge the included capacitor providing the energy to activate and operate the RFID tag.

If a semi-active tag is used, an included battery provides the energy necessary to operate the RFID tag. However, it does not operate as an active transmitter, but can only reflect, in varying degrees (i.e., modulate) the energy from the reader. If an active RFID tag is used, the RFID tag performs in a manner similar to a fully active transceiver in that it possesses an active transmitter and is capable of responding (i.e., transmitting) to a query from the reader on the vehicle using a different standard, including different frequencies. The power source of the RFID tag for semi-active and active operation may be from an included power source including, but not limited to, a battery, fuel cell, solar cell or the like and may also be able to derive power from a source not directly a part of the RFID tag (e.g., external battery, or other external power source).

It should be understood that different communication techniques such as, but not limited to, spread spectrum techniques may be employed with the RFID system. This could increase system range capability and also contribute to system stealthness by reducing signal detectability. As mentioned above, the RFID tags may be customized whereby elements including, but not limited to, antenna polarization, antenna type including fractal antennas, level of integration, unique means of tag placement, power source, and the like may be employed to advantage.

The RFID tag may operate in different modes of operation. In an inert mode, the RFID tag is not responding to any command other than the command to become active. This command can be internally or externally generated. In a listen mode, the RFID tag is active, but does not transmit or respond to any signals unless properly interrogated by the reader. Related modes to the listen mode include respond once or respond many (i.e., once queried continue to transmit until directed otherwise). In a ping mode, at predetermined (fixed or random) intervals, the RFID tag spontaneously transmits a signal to alert any reader that may be in the area without the reader first having to initiate a query command. In a standard mode, the RFID tag responds every time a legitimate command to do so is received from the reader. In a homing mode, the RFID tag responds with a high amplitude return signal when so directed. An application for this might be to aid in homing a weapon onto the RFID tag in the last few seconds before impact. In a self destruct mode, the RFID tag is irretrievably destroyed. Related modes to the self destruct mode include destruction upon an external command, at a predetermined time or at a future time downloaded thereto by the reader.

Thus, an interrogator and system employing the same have been introduced herein. In one embodiment, the interrogator includes a receiver (e.g., a correlating receiver) configured to receive a return signal from a tag (e.g., a RFID tag being active, semi-active or passive) and a sensing module (e.g., a position, velocity and time sensing module) configured to provide a time associated with the return signal. The interrogator also includes a processor (e.g., a synthetic aperture radar processor) configured to employ synthetic aperture radar processing on the return signal in accordance with the time to locate a position of the tag. The interrogator also includes a transmitter configured to code an interrogation signal for the tag and an antenna configured to send the interrogation signal to the tag. The interrogator also includes a controller configured to control an operation of the transmitter, the receiver, the sensing module and the processor. The sensing module of the interrogator is configured to provide a position of the interrogator and a velocity of the interrogator and the processor is configured to employ synthetic aperture radar processing on the return signal in accordance with the position of the interrogator, the velocity of the interrogator and the time to locate the position of the tag. A data logger of the interrogator is configured to log the position of the interrogator, the velocity of the interrogator, the time and the position of the tag. Also, the tag is configured to move relative to the interrogator.

Additionally, exemplary embodiments of the present invention have been illustrated with reference to specific components. Those skilled in the art are aware, however, that components may be substituted (not necessarily with components of the same type) to create desired conditions or accomplish desired results. For instance, multiple components may be substituted for a single component and vice-versa. The principles of the present invention may be applied to a wide variety of weapon systems. Those skilled in the art will recognize that other embodiments of the invention can be incorporated into a system employing devices capable of responding to excitation of energy impinging on them, as an example RF tags of various types, and detection approaches including, but not limited to, synthetic aperture radar techniques.

As described above, the exemplary embodiments provide both a method and corresponding apparatus consisting of various modules providing functionality for performing the steps of the method. The modules may be implemented as hardware (including an integrated circuit such as an application specific integrated circuit), or may be implemented as software or firmware for execution by a computer processor. In particular, in the case of firmware or software, the exemplary embodiment can be provided as a computer program product including a computer readable storage structure or medium embodying computer program code (i.e., software or firmware) thereon for execution by the computer processor.

Although the present invention has been described in detail, those skilled in the art should understand that they can make various changes, substitutions and alterations herein without departing from the spirit and scope of the invention in its broadest form. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An interrogator, comprising:
a receiver configured to receive return signals from a tag;
a sensing module configured to provide time estimates associated with said return signals; and
a processor configured to employ synthetic aperture radar processing with a mismatched filter to enhance a resolution of a correlation peak on said return signals in accordance with said time estimates and an estimated velocity of said interrogator to coherently integrate said return signals to locate a position of said tag, said mismatched filter being formed with filter tap values that enhance an output signal-to-noise ratio of said mismatched filter while reducing peak sidelobes thereof.

2. The interrogator as recited in claim 1 wherein said receiver is a correlating receiver.

3. The interrogator as recited in claim 1 further comprising a transmitter configured to code an interrogation signal for said tag.

4. The interrogator as recited in claim 3 further comprising an antenna configured to send said interrogation signal to said tag.

5. The interrogator as recited in claim 1 further comprising a controller configured control an operation of said receiver, said sensing module and said processor.

6. The interrogator as recited in claim 1 further comprising a data logger configured to log said time estimates and said position of said tag.

7. The interrogator as recited in claim 1 wherein said sensing module is configured to provide a position of said interrogator, said processor being further configured to employ said synthetic aperture radar processing on said return signals in accordance with said position of said interrogator to coherently integrate said return signals to locate said position of said tag.

8. The interrogator as recited in claim 1 wherein said tag is a radio frequency identification tag.

9. The interrogator as recited in claim 8 wherein said coherently integrate said return signals comprises constructing a phase of a local reference signal dependent on a time-dependent sum of squares of differences between coordinates of a position of said interrogator and coordinates of an hypothesized position of said tag.

10. The interrogator as recited in claim 1 wherein said tag is configured to move relative to said interrogator.

11. A method of operating an interrogator, comprising:
receiving return signals from a tag;
providing time estimates associated with said return signals; and
performing synthetic aperture radar processing with a mismatched filter to enhance a resolution of a correlation peak on said return signals in accordance with said time estimates and an estimated velocity of said interrogator to coherently integrate said return signals to locate a position of said tag, said mismatched filter being formed with filter tap values that enhance an output signal-to-noise ratio of said mismatched filter while reducing peak sidelobes thereof.

12. The method as recited in claim 11 wherein said receiving comprises performing correlation on said return signal.

13. The method as recited in claim 11 further comprising coding an interrogation signal for said tag.

14. The method as recited in claim 13 sending said interrogation signal to said tag.

15. The method as recited in claim 11 further comprising controlling said receiving, said providing and said performing.

16. The method as recited in claim 11 further comprising logging said time estimates and said position of said tag.

17. The method as recited in claim 11 further comprising providing a position of said interrogator, and further performing said synthetic aperture radar processing on said return signals in accordance with said position of said interrogator to coherently integrate said return signals to locate said position of said tag.

18. The method as recited in claim 11 wherein said tag is a radio frequency identification tag.

19. The method as recited in claim 18 wherein said coherently integrate said return signals comprises constructing a phase of a local reference signal dependent on a time-dependent sum of squares of differences between coordinates of a position of said interrogator and coordinates of an hypothesized position of said tag.

20. The method as recited in claim 11 wherein said tag is moving relative to said interrogator.

* * * * *